US008649556B2

(12) United States Patent
Wedge

(10) Patent No.: US 8,649,556 B2
(45) Date of Patent: Feb. 11, 2014

(54) MULTI-MODAL OBJECT SIGNATURE

(75) Inventor: Daniel John Wedge, St Leonards (AU)

(73) Assignee: Canon Kabushiki Kaisha, Tokyo (JP)

( * ) Notice: Subject to any disclaimer, the term of this patent is extended or adjusted under 35 U.S.C. 154(b) by 442 days.

(21) Appl. No.: 12/645,718

(22) Filed: Dec. 23, 2009

(65) Prior Publication Data

US 2010/0166262 A1 Jul. 1, 2010

(30) Foreign Application Priority Data

Dec. 30, 2008 (AU) ................................ 2008264232

(51) Int. Cl.
*G06K 9/00* (2006.01)
(52) U.S. Cl.
USPC ......................................................... 382/103
(58) Field of Classification Search
USPC .......... 382/103, 218, 224; 348/222.1, E5.024
See application file for complete search history.

(56) References Cited

U.S. PATENT DOCUMENTS

| 6,233,007 | B1 * | 5/2001 | Carlbom et al. ............... 348/157 |
| 7,058,205 | B2 | 6/2006 | Jepson et al. |
| 7,418,113 | B2 | 8/2008 | Porikli et al. |
| 2001/0046309 | A1 * | 11/2001 | Kamei ........................... 382/103 |
| 2003/0108220 | A1 * | 6/2003 | Jepson et al. ................... 382/103 |
| 2005/0012817 | A1 * | 1/2005 | Hampapur et al. ............ 348/143 |
| 2008/0181453 | A1 * | 7/2008 | Xu et al. ........................ 382/103 |

FOREIGN PATENT DOCUMENTS

WO WO 2005-050543 6/2005

OTHER PUBLICATIONS

U.S. Appl. No. 12/645,611, filed Dec. 23, 2009.

* cited by examiner

*Primary Examiner* — Amara Abdi
(74) *Attorney, Agent, or Firm* — Fitzpatrick, Cella, Harper & Scinto

(57) ABSTRACT

Disclosed herein are a method and system for appearance-invariant tracking of an object in an image sequence. A track is associated with the image sequence, wherein the track has an associated track signature comprising at least one mode. The method detects the object in a frame of the image sequence (1020). A representative signature is associated with the detected object. The method determines a spatial difference measure between the track and the detected object, and determines, for each mode of the track signature, a visual difference (1410) between the mode of the track signature and the representative signature to obtain a lowest determined visual difference (1420). The method then utilises the spatial difference measure and the lowest determined visual difference to perform at least one of the following steps of: (i) associating the detected object with the track (1440), and (ii) adding a new mode to the track signature (1460), based on the representative signature.

11 Claims, 18 Drawing Sheets

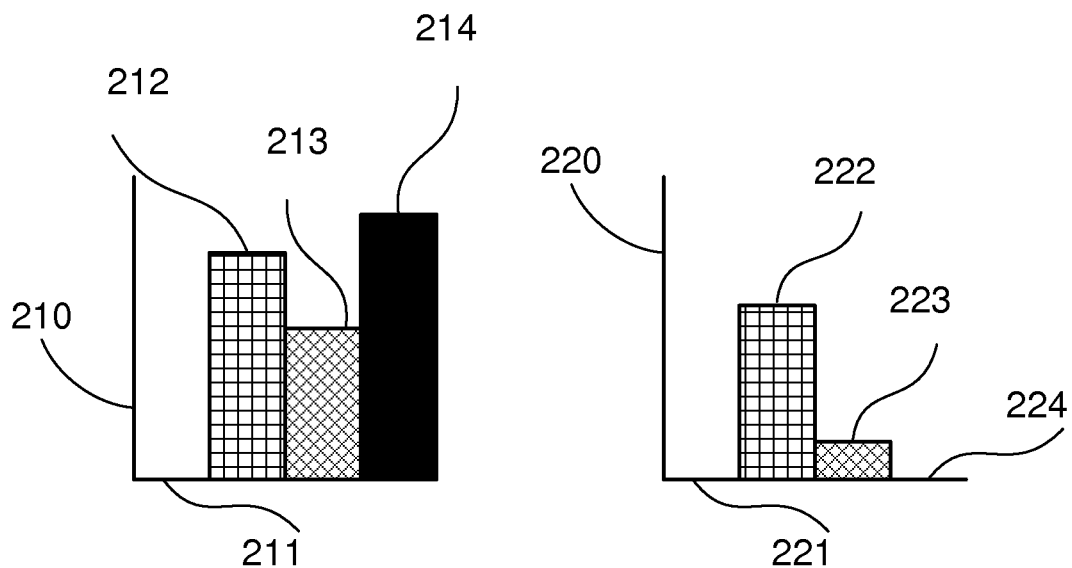
Fig. 2A     Fig. 2B
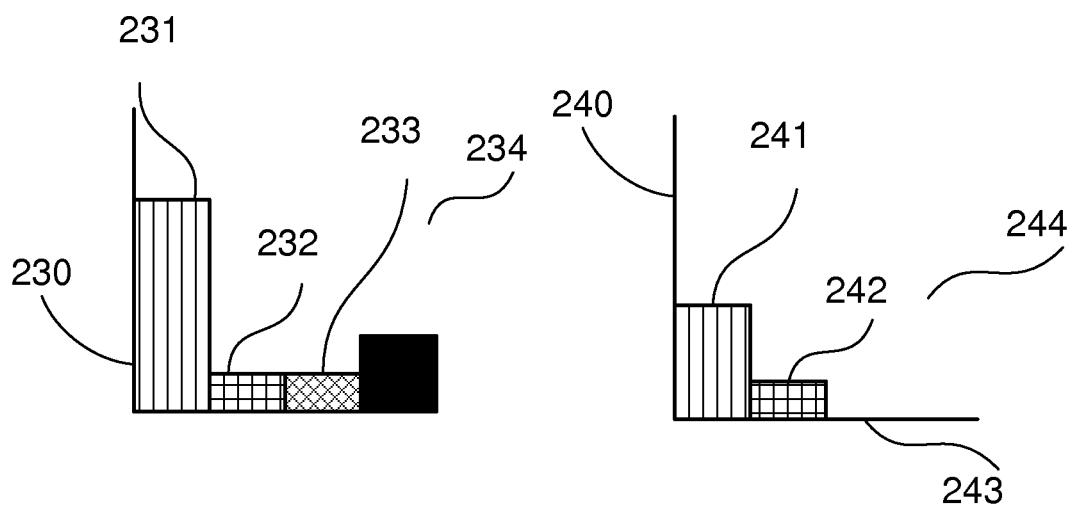
Fig. 2C     Fig. 2D

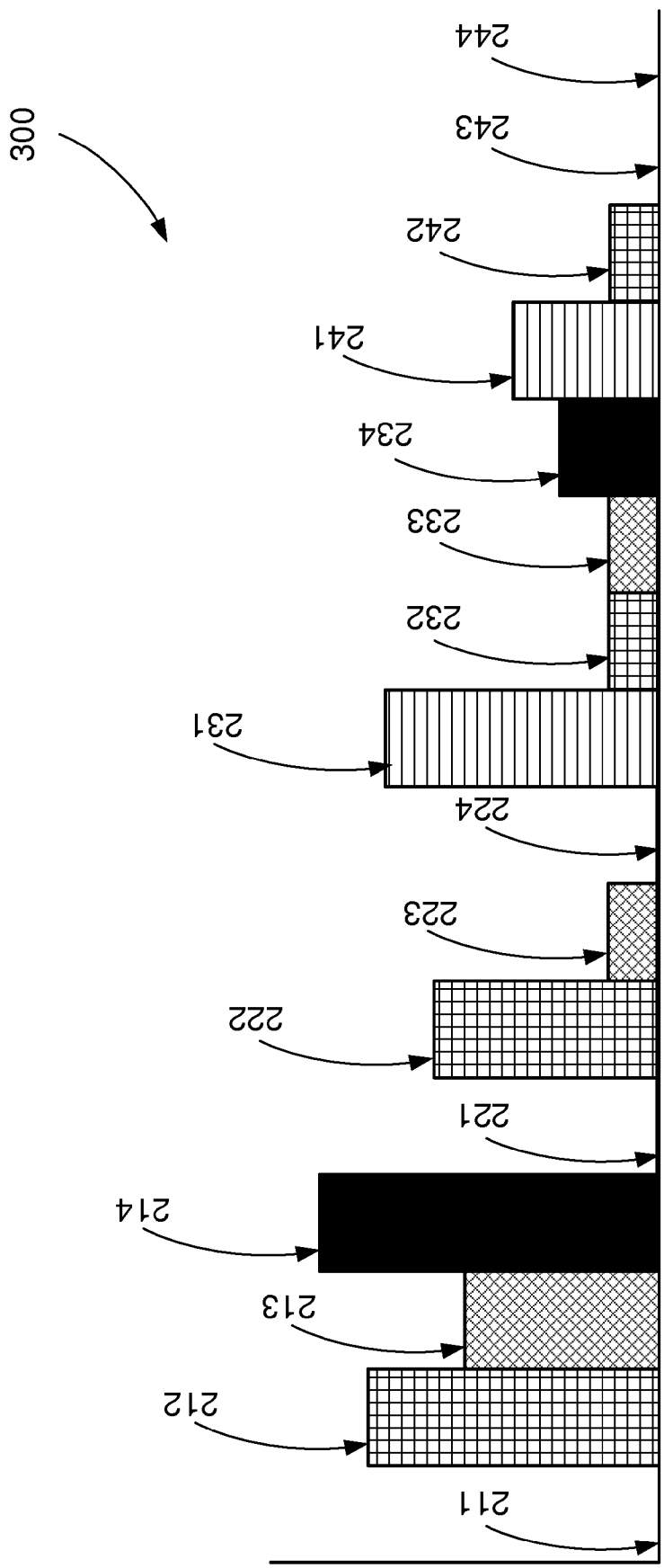

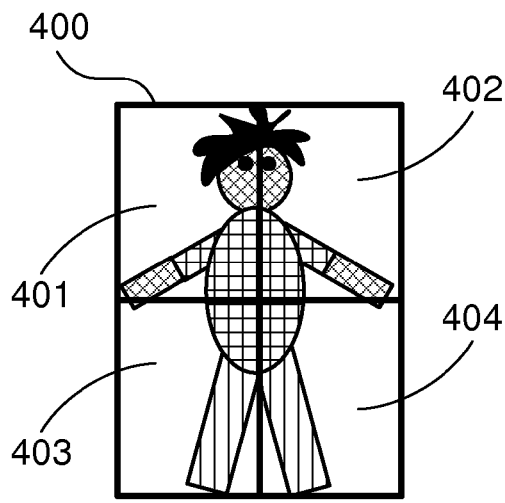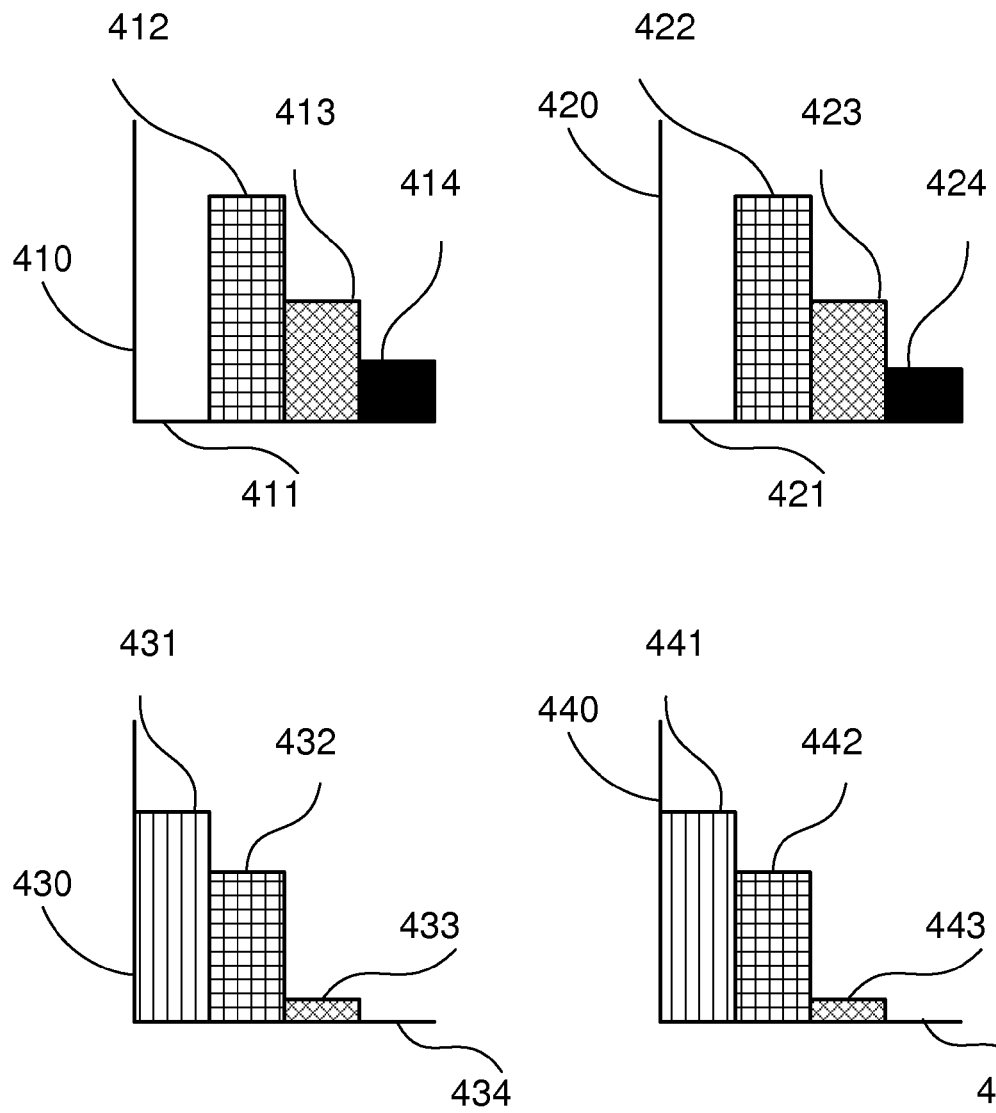
Fig. 4

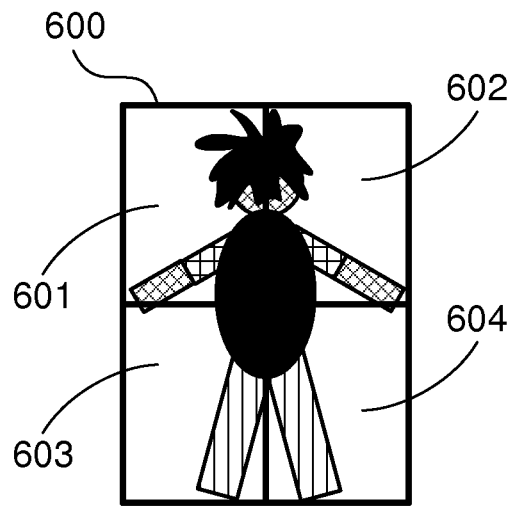
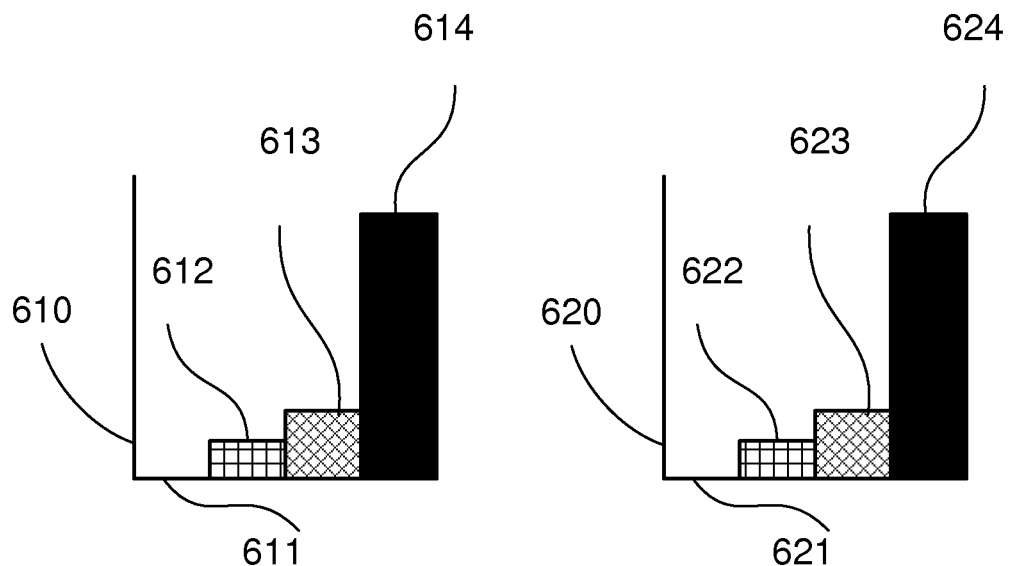
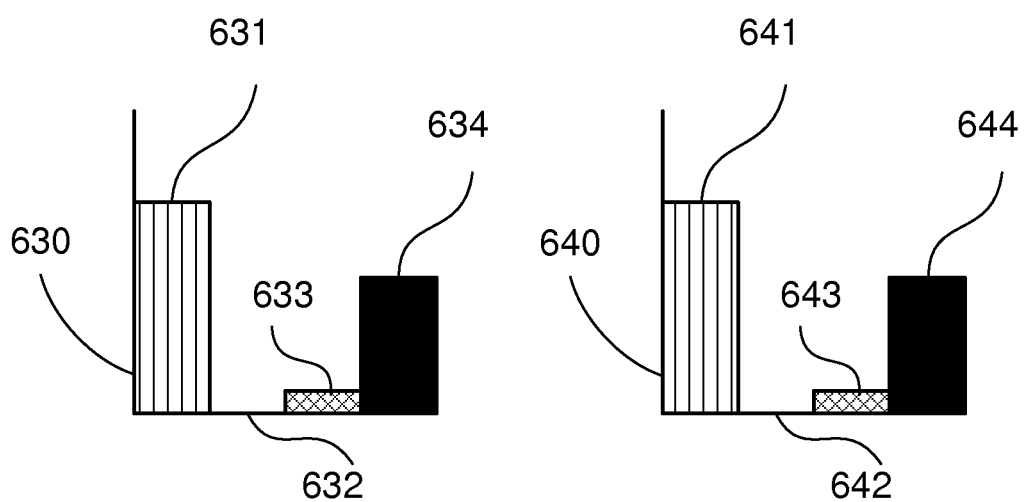
Fig. 6

MULTI-MODAL OBJECT SIGNATURE

RELATED APPLICATION

This application claims the right of priority under 35 U.S.C. §119 based on Australian Patent Application No. 2008264232 entitled "Multi-modal object signature", filed on 30 Dec., 2008 in the name of Canon Kabushiki Kaisha, the entire contents of which are incorporated herein by reference as if fully set forth herein.

TECHNICAL FIELD

The present disclosure relates to object tracking and, in particular, to appearance-invariant tracking of an object with a varying appearance over time.

BACKGROUND

Many existing approaches for tracking an object operate by matching characteristics of the object over multiple frames of a video sequence. Some tracking approaches use a position of an object or a size of an object. Performing object tracking using the position and size of an object can lead to incorrect tracking when multiple objects appear in a similar location with a similar size, since an object may be associated with the wrong track. Using an appearance of an object in addition to the position and size of the object can assist in preventing incorrect associations between two similarly located objects, where those two objects have difference appearances. An appearance of an object may relate, for example, to color or textures of the object.

One approach for tracking an object based on the appearance of the object uses a summary of the appearance of the object, known as a signature. In one approach, the signature is a histogram of color components associated with the object. A signature of an object detected in a current frame can be compared with a signature of an object from a previous frame. If there is a high similarity in the signatures and also in the spatial characteristics of the object, the object in the current frame can be associated with the object in the previous frame. Thus, tracking of the object over multiple frames is achieved. The spatial characteristics of the object may include, for example, the location and size of the object. However, this approach does not allow for tracking of objects having a varying appearance over time.

One approach for tracking an object having a varying appearance is a Clustering Method. Object signatures from a training data set are accumulated and clustering is performed on the training data to determine an exemplary signature for each cluster. When tracking an object, new signatures are added to the clusters, and the exemplary signatures of the clusters are determined again. One disadvantage with this method is that it requires many signatures to be stored in memory, and the method requires significant computational resources for the re-estimation of clusters. Another disadvantage with this method is that a clustering approach may fail when the collection of signatures do not form distinct clusters. Further, training data may not always be available in a practical application. Because of the nature of clustering algorithms, a completely new appearance of an object may not be represented in the exemplary signatures until sufficient occurrences of the new appearance have been observed. Hence, the Clustering Method results in a long initialization period for each new appearance of an object.

Another approach for tracking an object having a varying appearance over time is an Eigenbasis Method. The Eigenbasis Method constructs an eigenbasis from observed signatures. The eigenbasis reflects the principal components of the signature. By weighting each of the components of the eigenbasis and summing the weighted components, a signature of an object can be reconstructed. As further signatures of an object are acquired over time, the eigenbasis is updated, at the cost of computational efficiency. Further, as more signatures are acquired, less importance is placed on older signatures. Thus, the eigenbasis models the recent appearance of an object. As a result, the reoccurrence of an old appearance may not be recognized, since the eigenbasis represents more recent appearances. For example, if a person turns around from an initial orientation, the appearance of the person changes to a new appearance. When the same person turns back to the initial orientation, the eigenbasis approach treats this current orientation of the person as a new appearance, while really the current appearance of the person is a reoccurrence of an old appearance. Failing to treat the current appearance as a reoccurrence of the old appearance results in the creation of new tracks, where there really is one continuous track. Further, the eigenbasis approach is computationally expensive, because the eigenbasis approach must re-determine the eigenbasis to incorporate each new appearance of an object.

A further approach for tracking an object having a varying appearance over time is a Component-Based Method. The Component-Based Method models the signature of an object as two components: a stable component and a transient component. The stable component models a slowly changing part of the signature and is updated in small increments. The transient component models rapid, and possibly temporary, changes in the signature, and is frequently updated in larger amounts. The actual signature of the object is represented by a weighted sum of these two components. The weights applied to the components reflect the confidence in the stability of the signature. This enables the Component-Based Method to model the average signature whilst allowing for significant temporary variations. The Component-Based Method cannot distinguish between a temporary variation and a completely new appearance. As a consequence, when there are multiple objects, objects may be assigned to the wrong track. Further, due to the nature of the Component-Based Method, periodic changes in a signature can only be stored in the transient component of the signature. Frequent and significant updates to the transient component indicate that there is low confidence in the stability of the object signature. Thus, the appearances of objects that undergo periodic motion whilst in a stable configuration, such as a person walking, cannot be modelled with high confidence. To recover from low confidence in an appearance of an object, a re-initialization period is required during which the appearance of the object remains stable.

Thus, a need exists for an improved method of tracking an object having a varying appearance over time.

SUMMARY

It is an object of the present invention to overcome substantially, or at least to ameliorate, one or more disadvantages of existing arrangements.

According to a first aspect of the present disclosure, there is provided a method for tracking an object in an image sequence, wherein a track associated with the image sequence is associated with a track signature comprising a plurality of modes. The method includes the steps of detecting the object in a frame of the image sequence and associating the detected object with a representative signature. The method then determines a spatial difference measure between the track and the detected object, and determines, for each mode of the track signature, a visual difference between the mode of the track signature and the representative signature to obtain a lowest determined visual difference. The method utilizes the spatial difference measure and the lowest determined visual difference to perform at least one of the steps of: (i) associating the detected object with the track, and (ii) adding a new mode, based on the representative signature, to the track signature.

According to a second aspect of the present disclosure, there is provided a method for tracking an object in an image sequence, wherein a track associated with the image sequence is associated with a track signature comprising a plurality of modes. The method includes the steps of detecting the object in a frame of the image sequence and associating the detected object with a representative signature. The method determines a spatial difference measure between the track and the detected object and determines, for each to mode of the track signature, a visual difference between the mode of the track signature and the representative signature to obtain a lowest determined visual difference. The method then selects a best mode of the track signature, the best mode being associated with producing the lowest determined visual difference, associates the detected object with the track and updates the best mode using the representative signature of the detected object, if a sum of the spatial difference and the lowest determined visual difference is less than a combined difference threshold. The method then associates the detected object with the track and adding a new mode to the track signature based on the representative signature, if (i) a sum of the spatial difference and the lowest determined visual difference is greater than or equal to a combined difference threshold, and (ii) the spatial difference is less than a spatial difference threshold.

According to a third aspect of the present disclosure, there is provided a method for tracking an object in an image sequence, wherein a track associated with the image sequence is associated with a track signature comprising multiple regions, each of the regions comprising multiple modes. The method includes the steps of: detecting the object in a frame of the image sequence; associating the detected object with a representative signature comprising multiple regions, wherein each of the multiple regions of the track signature corresponds to one of the multiple regions of the representative signature of the detected object; determining a spatial difference measure between the track and the detected object; and determining, for each mode of each of the multiple regions of the track signature, a visual difference between the mode of the track signature and a corresponding region of the representative signature to obtain a lowest determined visual difference for each of the multiple regions. Then, if at least one of: (i) the spatial difference is less than a spatial difference threshold, and (ii) for each of the multiple regions, a sum of the spatial difference and the visual difference of the each of the multiple regions is less than a combined difference threshold, the method performs the steps of: associating the detected object with the track; and for each of the multiple regions, processing each region of the multiple regions in turn, where the processing comprises:

selecting a best mode of the region of the track signature producing the lowest determined visual difference;
    updating a best mode of the region using the representative signature of the detected object, if a sum of the spatial difference and the visual difference of the to region is less than a combined difference threshold; and
    adding a new mode to the region of the track signature based on the representative signature, if a sum of the spatial difference and the visual difference of the region is greater than or equal to a combined difference threshold.

According to a fourth aspect of the present disclosure, there is provided a method for tracking an object in an image sequence, wherein a track associated with the image sequence is associated with a track signature comprising multiple regions, each of the regions comprising multiple modes. The method detects the object in a frame of the image sequence, a representative signature being associated with the detected object and comprising multiple regions, wherein each of the multiple regions of the track signature corresponds to one of the multiple regions of the representative signature of the detected object. The method then determines a spatial difference measure between the track and the detected object, and determines, for each mode of each of the multiple regions of the track signature, a visual difference between the mode of the track signature and a corresponding region of the representative signature to obtain a lowest determined visual difference for each of the multiple regions. The method then utilizes the spatial difference measure and the lowest determined visual difference to perform at least one of the steps of: (i) associating the detected object with the track; and (ii) adding a new mode, based on the representative signature, to selected regions of the track signature.

According to a fifth aspect of the present disclosure, there is provided a system for tracking an object in an image sequence, wherein a track associated with the image sequence is associated with a track signature comprising a plurality of modes. The system includes a storage device for storing a computer program, and a processor for executing the program. The program includes code for detecting the object in a frame of the image sequence, a representative signature being associated with the detected object, and code for determining a spatial difference measure between the track and the detected object. The program also includes code for determining, for each mode of the track signature, a visual difference between the mode of the track signature and the representative signature to obtain a lowest determined visual difference, and code for utilizing the spatial difference measure and the lowest determined visual difference to perform at least one of the following steps of: (i) associating the detected object with the track, and (ii) adding a new mode, based on the representative signature, to the track signature.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present disclosure will now be described with reference to the following drawings, in which:

FIG. 2A to 2D are schematic representations showing histograms computed independently for portions of the detected object lying within each of the grid regions shown in FIG. 1C;

FIG. 3 is a concatenated histogram constructed from the histograms in FIG. 2;

FIG. 4 are schematic representations showing another view of the object depicted in FIG. 1A, with the bounding box divided into a grid and overlaid, and corresponding histograms for each of the grid regions;

FIG. 6 is a schematic representation showing a different view of the object depicted in FIG. 1A, with the bounding box divided into a grid and overlaid, and corresponding histograms for each of the grid regions;

DETAILED DESCRIPTION

Figure 1A:
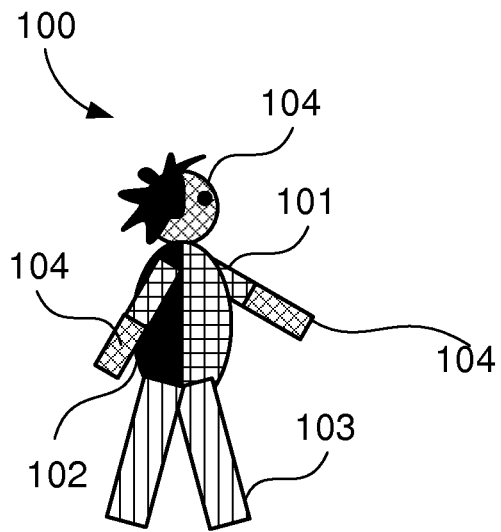
FIG. 1A is a schematic representation showing an example object detected in a frame of an image sequence.

Where reference is made in any one or more of the accompanying drawings to steps and/or features that have the same reference numerals, those steps and/or features have for the purposes of this description the same function(s) or operation(s), unless the contrary intention appears.

[Overview]

Object trackers can produce predictions of a size and position of an object. This prediction, or expectation, is compared to an actual next frame of a video sequence. The detected objects (detections) are then associated with the tracks via comparisons with the predictions. One or more embodiments of the present disclosure relate to the comparison process and the association process.

When comparing a detection and an expectation, spatial characteristics are often used. The spatial characteristics can include, for example, location and size. Visual characteristics can also be used, where an appearance of an object and an appearance of a track are summarised in a signature. One embodiment in accordance with the present disclosure stores multiple distinct appearances of an object over time in a multi-modal signature.

Multi-modal signatures have low computational and memory requirements. Further, modes can be created immediately from only one observation, whereas alternative methods, such as the Clustering Method, require a weight of evidence. No penalty is imposed by the tracker if the appearance of the tracked object alternates between a number of modes.

An embodiment of the present disclosure utilizing multi-modal signatures enables multiple appearances of an object over time in a video frame sequence to be recognized with high confidence. Multi-modal signatures store previously seen appearances of an object based on the visual characteristics of the appearances, thereby allowing an immediate switch to previously seen appearances of the object, without starting a new track. Hence, an object reverting to a previous appearance can be recognized by the tracker.

Multi-modal signatures allow for modes to be created and updated during processing of a video frame. Thus, in contrast to the Clustering Method, no training phase is necessary. Training is not always practical when a system must track an object that has not previously been observed and detected. Hence, multi-modal signatures are able to operate without a priori knowledge.

An embodiment of the present disclosure utilizing multi-modal signatures requires a short initialization period for new appearances of an object. When a new mode is created for a multi-modal signature, a new appearance of the object, which is significantly different from previously observed appearances, is stored immediately. The new mode has equal status with other modes within the multi-modal signature.

The process of updating modes of the multi-modal signature is relatively cheap in terms of memory and computational requirements. The process of updating a mode requires only the mode data of the mode to be updated and a representative signature of the incoming object. The mode update method only processes the mode data of the mode to be updated, which is significantly less than an archive of historical appearance data, for example as used in the Clustering Method. Only the mode data must be stored in memory, and historical appearances do not need to be retained.

One embodiment of the present disclosure utilizes multi-modal signatures for performing tracking over multiple cameras. In such an embodiment, an object vanishing from a field of view of a first camera has a first appearance prior to vanishing. When the same object appears in a field of view of a second camera, the object may have a second appearance, wherein the second appearance is different from the first appearance. The difference between the first appearance and second appearance may be due to orientations of the first and second cameras viewing the object from different angles, or due to the object changing its pose whilst out of view of the cameras. When employing multi-modal signatures, multiple poses of the tracked object are encapsulated in the multi-modal signature. Thus, upon observing the object for the first time in the field of view of the second camera, if the second appearance has previously been observed whilst the object was in the field of the first camera and stored as one mode of the multi-modal signature, successful recognition of the object will be achieved.

According to an embodiment of the present disclosure, there is provided a method for tracking an object in an image sequence. A track is associated with the image sequence, wherein the track is associated with a track signature comprising a plurality of modes. The method detects the object in a frame of the image sequence. A representative signature is associated with the detected object. The method determines a spatial difference measure between the track and the detected object, and determines, for each mode of the track signature, a visual difference between the mode of the track signature and the representative signature to obtain a lowest determined visual difference and the mode corresponding to the lowest determined visual difference. The method then utilizes the spatial difference measure and the lowest determined visual difference to perform at least one of the steps of: (i) associating the detected object with the track, and (ii) adding a new mode, based on the representative signature, to the track signature.

According to another embodiment of the present disclosure, there is provided a method for tracking an object in an image sequence, wherein a track associated with the image sequence is associated with a track signature comprising a plurality of modes. The method detects the object in a frame of the image sequence, wherein a representative signature is associated with the detected object. The method then determines a spatial difference measure between the track and the detected object, and determines, for each mode of the track signature, a visual difference between the mode of the track signature and the representative signature to obtain a lowest determined visual difference. The method selects a best mode of the track signature, the best mode being associated with producing the lowest determined visual difference. The method then associates the detected object with the track and updates the best mode using the representative signature of the detected object, if a sum of the spatial difference and the lowest determined visual difference is less than a combined difference threshold, or associates the detected object with the track and adding a new mode to the track signature based on the representative signature, if: (i) a sum of the spatial difference and the lowest determined visual difference is not less than a combined difference threshold, and (ii) the spatial difference is less than a spatial difference threshold.

According to a further embodiment of the present disclosure, there is provided a method for tracking of an object in an image sequence. A track associated with the image sequence has an associated track signature comprising multiple regions, wherein each of the regions comprises multiple modes. The method detects the object in a frame of the image sequence, wherein a representative signature comprising multiple regions is associated with the detected object. Each of the multiple regions of the track signature corresponds to one of the multiple regions of the representative signature of the detected object. The method determines a spatial difference measure between the track and the detected object, and determines, for each mode of each of the multiple regions of the track signature, a visual difference between the mode of the track signature and a corresponding region of the representative signature to obtain a lowest determined visual difference for each of the multiple regions. The method then, if at least one of: (i) the spatial difference is less than a spatial difference threshold, and (ii) for each of the multiple regions, a sum of the spatial difference and the visual difference of the each of the multiple regions is less than a combined difference threshold, performs the following steps. The method associates the detected object with the track, and for each of the multiple regions, processes each region of the multiple regions in turn, where the processing includes: selecting a best mode of the region of the track signature producing the lowest determined visual difference; updating a best mode of the region using the representative signature of the detected object, if a sum of the spatial difference and the visual difference of the region is less than a combined difference threshold; and adding a new mode to the region of the track signature based on the representative signature, if a sum of the spatial difference and the visual difference of the region is not less than a combined difference threshold.

According to another embodiment of the present disclosure, there is provided a method for tracking an object in an image sequence, wherein a track associated with the image sequence is associated with a track signature comprising multiple regions, each of the regions comprising multiple modes. The method detects the object in a frame of the image sequence, wherein a representative signature is associated with the detected object and includes multiple regions. Each of the multiple regions of the track signature corresponds to one of the multiple regions of the representative signature of the detected object. The method determines a spatial difference measure between the track and the detected object, and determines, for each mode of each of the multiple regions of the track signature, a visual difference between the mode of the track signature and the representative signature to obtain a lowest determined visual difference for each of the multiple regions. The method then utlizes the spatial difference measure and the lowest determined visual difference to perform at least one of the following steps of: (i) associating the detected object with the track; and (ii) adding a new mode, based on the representative signature, to selected regions of the track signature.

According to a further embodiment of the present disclosure, there is provided a system for tracking an object in an image sequence, wherein a track associated with the image sequence is associated with a track signature comprising at least one mode. The system includes a storage device for storing a computer program, and a processor for executing the program. The program includes code for detecting the object in a frame of the image sequence, a representative signature being associated with the detected object, and code for determining a spatial difference measure between the track and the detected object. The program further includes code for determining, for each mode of the track signature, a visual difference between the mode of the track signature and the representative signature to obtain a lowest determined visual difference, and code for utilizing the spatial difference measure and the lowest determined visual difference to perform at least one of the following steps of: (i) associating the detected object with the track, and (ii) adding a new mode, based on the representative signature, to the track signature.

[Object Detection]

A video is a sequence of images or frames. Thus, each frame is an image in an image sequence. Each frame of the video has an x axis and a y axis. A scene is the information contained in a frame and may include, for example, foreground objects, background objects, or a combination thereof A scene model is stored information relating to a background. A scene model generally relates to background information derived from an image sequence. A video may be encoded and compressed. Such encoding and compression may be performed intra-frame, such as motion-JPEG (M-JPEG), or inter-frame, such as specified in the H.264 standard.

An image is made up of visual elements. The visual elements may be, for example, pixels, or 8×8 DCT (Discrete Cosine Transform) blocks as used in JPEG images in a motion-JPEG stream.

For the detection of real-world objects visible in a video, a foreground separation method is applied to individual frames of the video, resulting in detections. Other methods of detecting real-world objects visible in a video are also known and may equally be practiced. Such methods include, for example, image segmentation.

In one arrangement, foreground separation is performed by frame differencing. Frame differencing subtracts a current frame from a previous frame. In another arrangement, foreground separation is done by background modelling. That is, a scene model is created by aggregating the visual characteristics of pixels or blocks in the scene over multiple frames spanning a time period. Visual characteristics that have contributed consistently to the model are considered to form the background. Any area where the background model is different from the current frame is then considered to be foreground.

A detection has a spatial representation containing at least a height, a width, and a position. In one implementation, the position is provided by both x and y co-ordinates. There may be more characteristics associated with the spatial representation of a detection. Such characteristics can include, for example, one or more of a roundness measure, or a principal axis. The characteristics may be based, for example, on a silhouette of the object, or on the original visual content corresponding to the object. In one arrangement, the position of the spatial representation of the detection is the top-left corner of a bounding box (with width and height) of the detection. In another arrangement, the position of the spatial representation of the detection is the centroid of the spatial representation of the detection, the width of the spatial representation of the detection is the difference between the greatest and smallest x-coordinate that is part of the detection, and the height is computed in a similar fashion along the y-axis.

[Signatures]

In addition to a spatial representation of an object, an object may also have a visual representation, otherwise known as a signature, which is a summary of an appearance of the object. In one arrangement, the signature is a histogram of color components. In another arrangement, the signature is a histogram of luminance components. In yet another arrangement, the signature is a contour of an outline of the object. In a further arrangement, the signature includes one or more histograms, contours, and any combinations thereof.

Figure 1B:
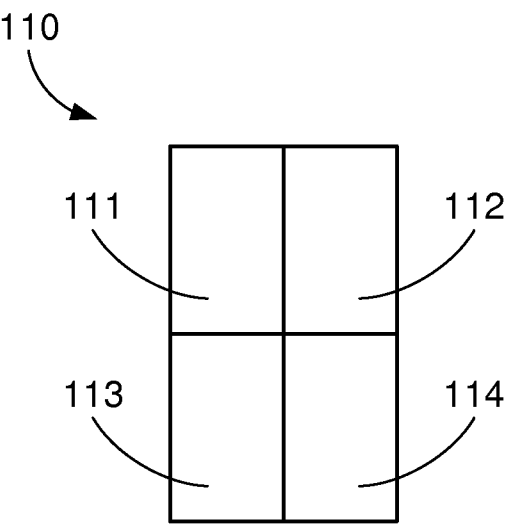
FIG. 1B is a schematic representation showing a grid of the same dimensions as a bounding box of the detected object depicted in FIG. 1A.
Figure 1C:
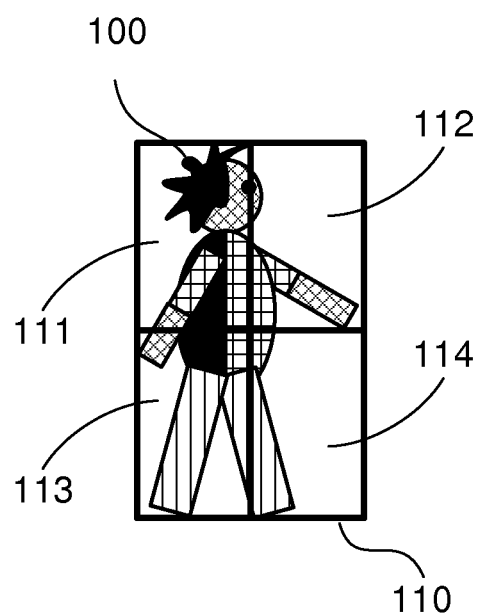
FIG. 1C is a schematic representation showing the grid from FIG. 1B overlaid on the detected object depicted in FIG. 1A.

FIGS. 1A, 1B, and 1C are schematic representations illustrating an example of computing a histogram-based signature for a detection corresponding to a detected object in a video frame. FIG. 1A shows a person 100 wearing clothes, with each of the shirt front 101, shirt back 102 and trousers 103 being textured differently. The shirt front 101 is textured with a vertical-horizontal cross-hatched texture. The shirt back 102 is textured with a solidly-filled texture. The trousers 103 are textured with a vertically-striped texture. In addition, the skin 104 of the person also has a unique diagonally cross-hatched texture.

FIG. 1B shows a bounding box 110 of the person 100. The bounding box 110 is the smallest upright rectangle enclosing the person 100. The bounding box 110 is divided into quarters by dividing the box both vertically and horizontally. Each quarter of the bounding box 110 is known as a grid region. Dividing the bounding box 110 results in a top-left region of the bounding box 111, a top-right region of the bounding box 112, a bottom-left region of the bounding box 113, and a bottom-right region of the bounding box 114. In another arrangement, the bounding box is an ellipse with a width, height and angle of rotation. The bounding box is the smallest ellipse enclosing the object. The vertical axis of the ellipse (also known as the conjugate diameter or minor axis) and the horizontal axis (also known as the transverse diameter or major axis) are then used to divide the bounding box into grid regions.

FIG. 1C shows the bounding box 110 positioned over the person 100, thus dividing the area containing the person into quarters. Each quarter corresponds to one grid region. For each quarter, a histogram is computed. FIGS. 2A to 2D are schematic representations showing histograms computed for each grid region of the bounding box 110. The top-left region of the bounding box 111 contains a majority of a head of the person, portions of both the shirt front and shirt back, and some of a right arm of the person 100. FIG. 2A shows a histogram 210, which contains the histogram for the top-left region of the bounding box 111. The top-right region of the bounding box 112 contains some of the head of the person, some of the shirt front, and a left arm of the person 100. FIG. 2B shows a histogram 220, which contains the histogram for the top-right region of the bounding box 112. The bottom-left region of the bounding box 113 mainly contains legs of the person, and also some of the shirt front, shirt back and right arm. FIG. 2C shows a histogram 230, which contains the histogram for the bottom-left region of the bounding box 113. The bottom-right region of the bounding box 114 contains some of a leg of the person, and a small portion of the shirt front. FIG. 2D is a histogram 240, which contains the histogram for the bottom-right region of the bounding box 114.

Now, consider the histogram 210 derived from the top-left region of the bounding box 111. A majority of foreground within the top-left region of the bounding box 111 is the solidly filled shirt back and hair of the person, as indicated by the histogram bin 214. The next most frequently occurring texture present in the top-left region of the bounding box 111 is the vertical-horizontal cross-hatched texture, shown by histogram bin 212. The third most frequent texture present in the top-left region of the bounding box 111 is the diagonally cross-hatched texture of the skin of the person, shown by histogram bin 213. The vertically-striped texture is not present in the top-left region of the bounding box 111 and the histogram bin 211 corresponding to the vertically-striped texture is empty. Note that the histogram 210 is constructed only from the area of the top-left region of the bounding box 111 that contains the person. Thus, the histogram does not include background information.

Next, consider the histogram 220 derived from the top-right region of the bounding box 112. A majority of foreground within the top-right region of the bounding box 112 is the vertical-horizontal cross-hatched texture, shown by histogram bin 222. The next most frequently occurring texture present in the top-right region of the bounding box 112 is the diagonally cross-hatched texture, shown by histogram bin 223. The vertically-striped texture is not present in the top-right region of the bounding box 112 and the histogram bin 221 corresponding to the vertically-striped texture is empty. The solidly filled texture is also not present in the top-right region of the bounding box 112 and the histogram bin 224 corresponding to the solidly-filled texture is empty.

Thirdly, consider the histogram 230 derived from the bottom-left region of the bounding box 113. A majority of foreground within the bottom-left region of the bounding box 113 is the vertically-striped texture corresponding to the trousers of the person, shown by histogram bin 231. The next most frequently occurring texture present in the bottom-left region of the bounding box 113 is the solidly-filled texture of the shirt back, shown by histogram bin 234. A small portion of the diagonally cross-hatched texture is visible in the bottom-left region of the bounding box 113 and is shown by histogram bin 233. A small region of the vertical-horizontal cross-hatched texture is also visible in the bottom-left region of the bounding box 113 and the corresponding histogram bin is shown by 232.

Finally, consider the histogram 240 derived from the bottom-right region of the bounding box 114. A majority of foreground within the bottom-right region of the bounding box 114 is the vertically-striped texture corresponding to the trousers of the person, shown by histogram bin 241. The next most frequently occurring texture present in the bottom-right region of the bounding box 114 is a small portion of the vertical-horizontal cross-hatched texture of the shirt front, shown by histogram bin 242. The diagonally cross-hatched texture is not visible in the bottom-right region of the bounding box 114 and the corresponding histogram bin 243 is empty. The solidly-filled texture is not visible in the bottom-right region of the bounding box 114 and the corresponding histogram bin 244 is empty.

Once the histograms for each grid region have been computed, the histograms are concatenated. FIG. 3 shows the result of concatenating the histogram of the top-left region 210, the histogram of the top-right region 220, the histogram of the bottom-left region 230 and the histogram of the bottom-right region 240. The bin values of the concatenated histogram 300 are directly derived from the four previously computed histograms 210, 220, 230, and 240.

For illustrative purposes, simple textures have been used as the basis of the histogram bins. In one arrangement, the bins of the histograms are derived from the luminance values of the detection. In another arrangement, the bins of the histograms are derived from the hue values of the detection. The hue may be the actual hue of each pixel or an approximation of the hue derived from the chrominance channels of each 8×8 DCT block of a JPEG image. In yet another arrangement, the bins of the histograms are derived from the orientations of the edges of the contour of the detection. In one arrangement, each histogram contains 8 bins. In another arrangement, each histogram contains 4 bins. In one arrangement, one type of histogram is used, such as, for example, a luminance histogram. In another arrangement, multiple types of histograms are used, such as, for example, a luminance histogram and a hue histogram.

In FIG. 1, the bounding box 110 is divided into a 2×2 grid. In one arrangement, the bounding box is divided into a 4×4 grid, in which case the concatenated histogram contains the 16 histograms from each of the grid regions. Other bounding boxes and grids may equally be practised without departing from the spirit and scope of the present disclosure.

Constituent elements of the signature of the detection are computed from the bin values of the concatenated histogram 300. In one arrangement, the number of elements in the signature is equal to the number of bins in the concatenated histogram and each element of the signature is equal to the element of the corresponding bin divided by the "L1 norm" of the histogram. The L1 norm of the histogram is the sum of the contents of the bins of the histogram. That is, the L1 norm of a vector formed from the bin values of the histogram is the Manhattan norm of the vector. If the n bins of the histogram are denoted by $p_i$, the L1 norm of the histogram is given by:

$$L_1 = \sum_{i=1}^{n} p_i \tag{1}$$

In another arrangement, the number of elements in the signature is equal to the number of bins in the concatenated histogram and each element of the signature is equal to the element of the corresponding bin divided by the "L2 norm" of the histogram. The L2 norm of the histogram is computed by firstly squaring the value of each histogram bin, summing the squared values, and then taking the square root of the sum. That is, the L2 norm of the vector formed from the bin values of the histogram is the Euclidean norm of the vector. If the n bins of the histogram are denoted by $p_i$, the L2 norm of the histogram is given by:

$$L_2 = \sqrt{\sum_{i=1}^{n} p_i^2} \tag{2}$$

In one arrangement, the signature is derived from one concatenated histogram. In one example, the concatenated histogram is derived from hue values. In another arrangement, the signature is derived from multiple concatenated histograms. In one example, the signature is derived from a concatenated histogram of luminance values and a concatenated histogram of hue values.

[Multi-Modal Signatures]

A signature is a summary of an observed appearance of an object. In image sequences, the appearance of an object changes over time, resulting in a change in the signature of the object. For example, the appearance of an object may change due to lighting changes (which affect histograms computed from hue values) or due to pose changes (which affect the distribution over the grid regions). It is important to recognize various appearances of an object over time to provide accurate tracking.

A multi-modal signature stores multiple representations of an object, where each representation is known as a mode. The modes of the multi-modal signature can be added, created or deleted. In one arrangement, the maximum number of modes is limited only by a memory capacity of the system. In another arrangement, the maximum number of modes is fixed at a finite predetermined maximum number of modes. In one example, the maximum number of modes is set to 5. The maximum number of modes is dependent on the particular application to which an embodiment of the present disclosure is applied. The system does not have to use the maximum number of modes. For example, if an object has been observed only once, then only one mode is required to store the representation of the object.

FIG. 4 and FIG. 6 are schematic representations illustrating alternative poses of the person 100 previously seen in FIG. 1A.

First, FIG. 4 provides a view of the front of the person and four derived histograms. The bounding box of the person 400 is divided into a 2×2 grid. A top-left grid region 401 and a top-right grid region 402 both contain: a shirt front of the person, wherein the shirt front has a vertical-horizontal cross-hatched texture; arms and face of the person, wherein the arms and face are both textured with a diagonally cross-hatched texture; and hair with a solidly-filled texture. A bottom-left grid region 403 and a bottom-right grid region 404 both contain portions of the shirt front of the person, wherein the shirt front has a vertical-horizontal cross-hatched texture, trousers of the person, wherein the trousers have a vertically-striped texture, and a small portion of arms of the person.

The top-left grid region 401 has a corresponding histogram 410. The most frequently occurring texture is the vertical-horizontal cross-hatched texture of the shirt front of the person, indicated by histogram bin 412. The next most-frequently occurring texture is the diagonally cross-hatched skin texture, indicated by histogram bin 413. Next, the solidly-filled texture of the hair of the person occurs less frequently, as shown by histogram bin 414. The vertically-striped texture of the trousers of the person does not appear at all in the top-left grid region 401 and the corresponding histogram bin 411 is empty.

The top-right grid region 402 has a corresponding histogram 420. The most frequently occurring texture is the vertical-horizontal cross-hatched texture of the shirt front of the person, indicated by histogram bin 422. The next frequently occurring texture is the diagonally cross-hatched skin texture, indicated by histogram bin 423. Next, the solidly-filled texture of the hair of the person occurs less frequently as shown by histogram bin 424. The vertically-striped texture of the trousers of the person does not appear at all in the top-left grid region 402 and the corresponding histogram bin 421 is empty.

The bottom-left grid region 403 has a corresponding histogram 430. The most frequently occurring texture is the vertically-striped texture of the trousers of the person, indicated by histogram bin 431. The next frequently occurring texture is the vertical-horizontal cross-hatched texture of the shirt front of the person, indicated by histogram bin 432. The hands of the person, with a diagonally cross-hatched texture, contribute to the next smallest histogram bin 433. The solidly-filled texture of the hair and shirt back are not visible in the bottom-left grid region 403, and so the corresponding histogram bin 434 is empty.

The bottom-right grid region 404 has a corresponding histogram 440. The most frequently occurring texture is the vertically-striped texture of the trousers of the person, indicated by histogram bin 441. The next frequently occurring texture is the vertical-horizontal cross-hatched texture of the shirt front of the person, indicated by histogram bin 442. The hands of the person, with a diagonally cross-hatched texture, contribute to the next smallest histogram bin 443. The solidly-filled texture of the hair and shirt back are not visible in the bottom-right grid region 404 and so the corresponding histogram bin 444 is empty.

Figure 5:
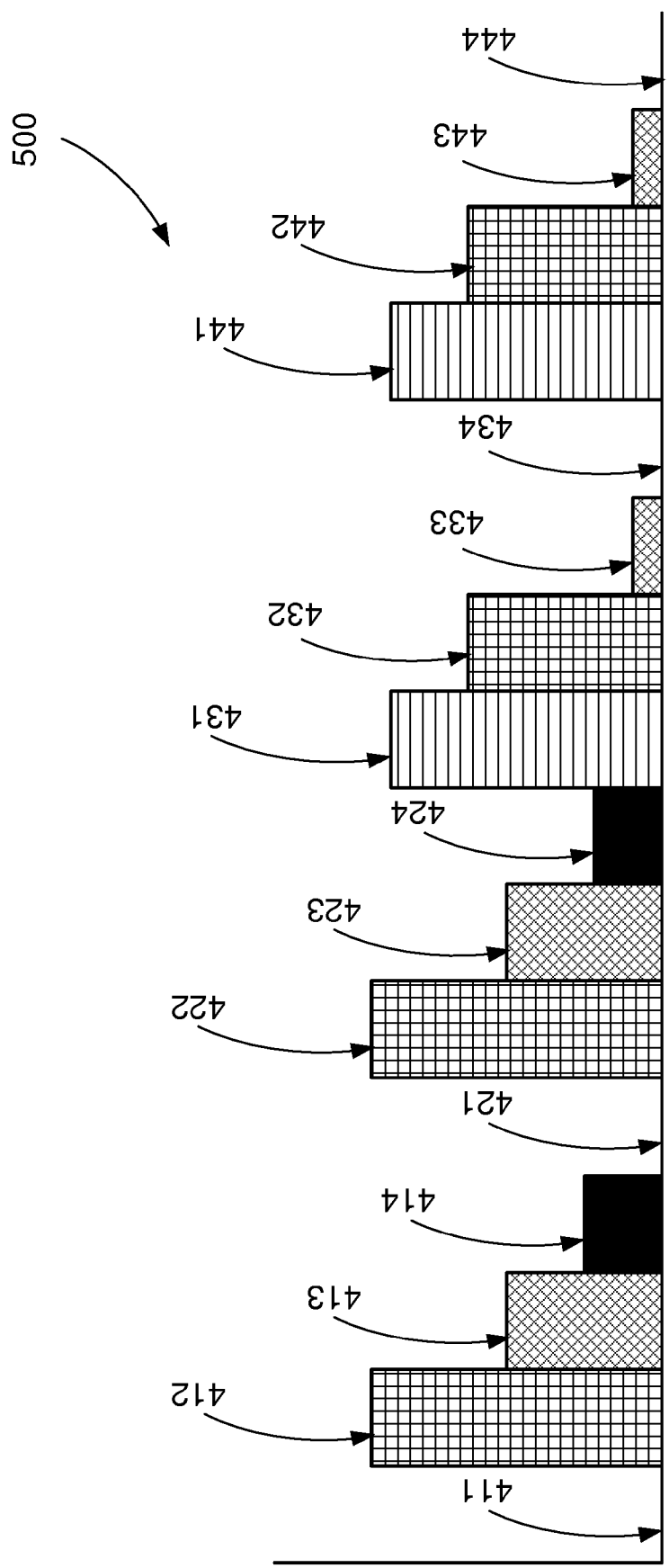
FIG. 5 shows the result of concatenating the histograms shown in FIG. 4.

FIG. 5 shows a concatenated histogram 500 computed from the front view of the person, as shown in FIG. 4. The concatenated histogram 500 is constructed from the histogram of the top-left region 410, the histogram of the top-right region 420, the histogram of the bottom-left region 430 and the histogram of the bottom-right region 440.

Next, FIG. 6 provides a view of the back of the person and four derived histograms. The bounding box of the person 600 is divided into a 2×2 grid. A top-left grid region 601 and a top-right grid region 602 both contain: hair and shirt back of the person, wherein the hair and shirt back are both shown with a solidly-filled texture; shirt sleeves with a vertical-horizontal cross-hatched texture; and arms of the person, wherein the arms are textured with a diagonally cross-hatched texture. A bottom-left grid region 603 and a bottom-right grid region 604 both contain portions of a shirt front of the person, wherein the shirt front has a vertical-horizontal cross-hatched texture, trousers of the person, wherein the trousers have a vertically-striped texture, and a small portion of arms of the person.

The top-left grid region 601 has a corresponding histogram 610. The most frequently occurring texture is the solidly-filled texture of the hair and shirt back of the person, as shown by histogram bin 614. The next frequently occurring texture is the diagonally cross-hatched skin texture, indicated by histogram bin 613. The next most frequently occurring texture is the vertical-horizontal cross-hatched texture of the shirt sleeves of the person, indicated by histogram bin 612. The vertically-striped texture of the trousers of the person does not appear at all in the top-left grid region 601 and the corresponding histogram bin 611 is empty.

The top-right grid region 602 has a corresponding histogram 620. The most frequently occurring texture is the solidly-filled texture of the hair and shirt back of the person, as shown by histogram bin 624. The next frequently occurring texture is the diagonally cross-hatched skin texture, indicated by histogram bin 623. The next most frequently occurring texture is the vertical-horizontal cross-hatched texture of the shirt sleeves of the person, indicated by histogram bin 622. The vertically-striped texture of the trousers of the person does not appear at all in the top-right grid region 602 and the corresponding histogram bin 621 is empty.

The bottom-left grid region 603 has a corresponding histogram 630. The most frequently occurring texture is the vertically-striped texture of the trousers of the person, indicated by histogram bin 631. The next frequently occurring texture is the solidly-filled texture of the shirt back of the person, indicated by histogram bin 634. The hands of the person, with a diagonally cross-hatched texture, contribute to the next smallest histogram bin 633. The vertical-horizontal cross-hatched texture of the shirt sleeves is not visible in is the bottom-left grid region 603 and so the corresponding histogram bin 632 is empty.

The bottom-right grid region 604 has a corresponding histogram 640. The most frequently occurring texture is the vertically-striped texture of the trousers of the person, indicated by histogram bin 641. The next frequently occurring texture is the solidly-filled texture of the shirt back of the person, indicated by histogram bin 644. The hands of the person, with a diagonally cross-hatched texture, contribute to the next smallest histogram bin 643. The vertical-horizontal cross-hatched texture of the shirt sleeves is not visible in the bottom-right grid region 604 and so the corresponding histogram bin 642 is empty.

Figure 7:
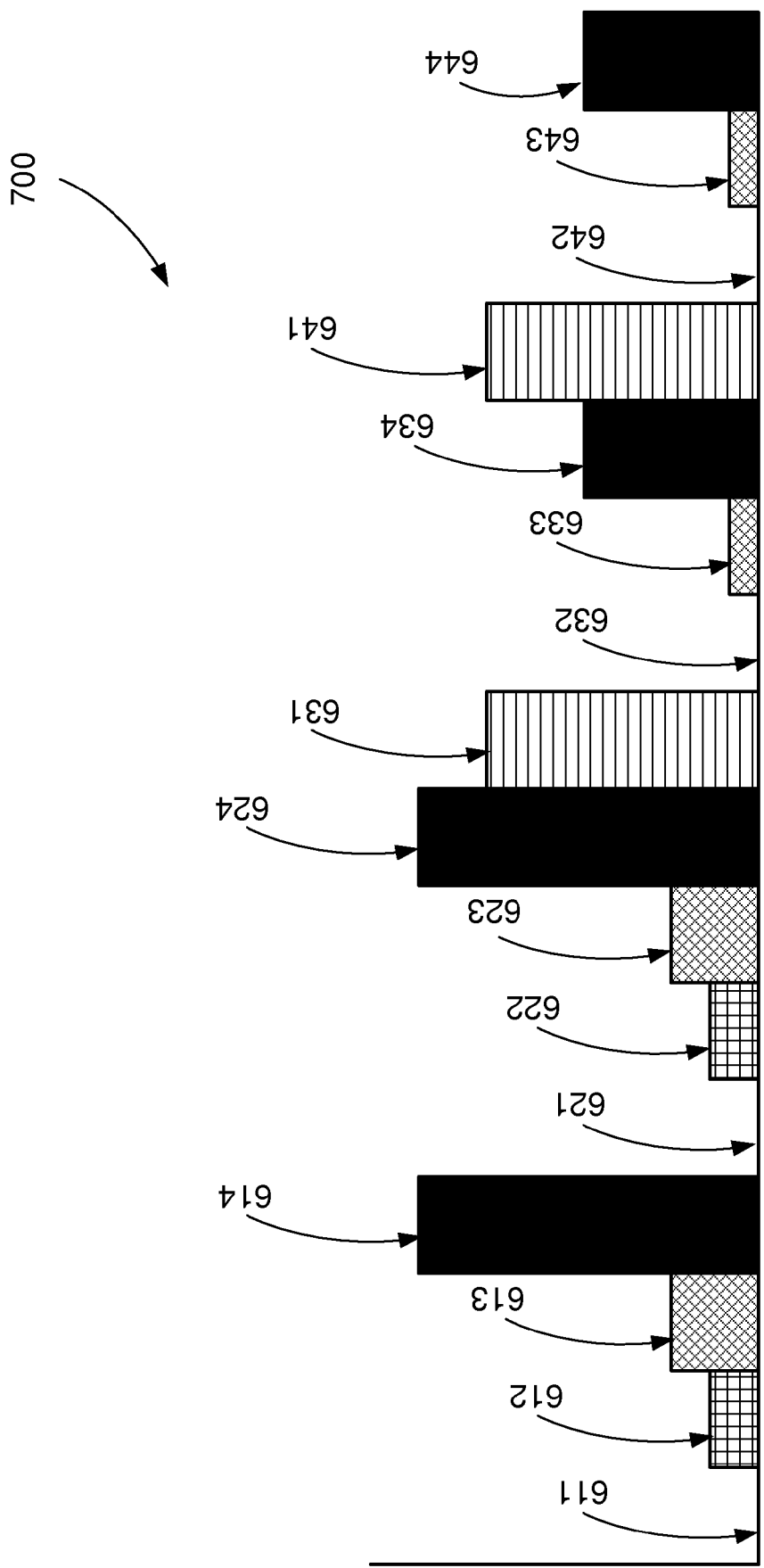
FIG. 7 shows the result of concatenating the histograms shown in FIG. 6.

FIG. 7 shows a concatenated histogram 700 computed from the back view of the person, as shown in FIG. 6. The concatenated histogram 700 is constructed from the histogram of the top-left region 610, the histogram of the top-right region 620, the histogram of the bottom-left region 630 and the histogram of the bottom-right region 640.

Figure 8:
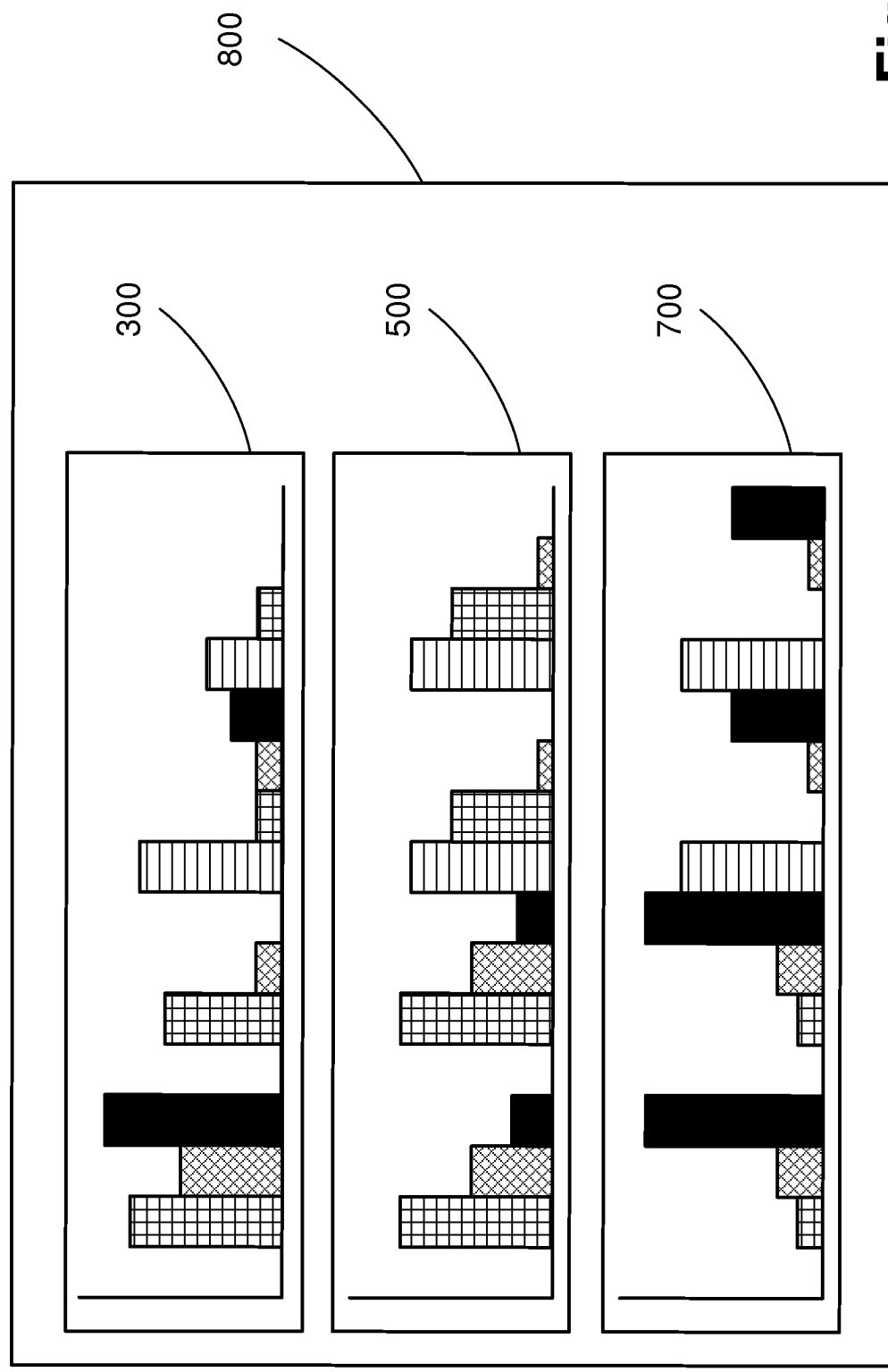
FIG. 8 shows a first arrangement of a multi-modal signature where the modes are the concatenated histograms from FIG. 3, FIG. 5, and FIG. 7.

FIG. 8 shows a first arrangement of a multi-modal signature 800 containing multiple concatenated histograms 300, 500, and 700. The concatenated histogram of the side view of the person 300, the concatenated histogram of the front view of the person 500 and the concatenated histogram of the back view of the person 700 are all significantly different. This is because the three concatenated histograms represent three different views of the person. Thus, the multi-modal signature 800 provides for recognition of multiple poses of an object as observed over time, such as, for example, the multiple appearances in different frames of an object being tracked.

In this first arrangement of a multi-modal signature, the visual difference between the multi-modal signature and a representative signature exemplifying a single appearance of a detection is computed by firstly individually calculating a visual difference between each mode of the multi-modal signature and the representative signature. The visual difference between the multi-modal signature and the other signature is then the lowest visual difference between a mode and the representative signature. In one arrangement, the visual difference is the Bhattacharyya coefficient computed from the two histograms. That is, given two histograms each with n bins, if corresponding bins from each histogram are denoted $p_i$ and $q_i$, the Bhattacharyya coefficient c is given by:

$$c = \sum_{i=1}^{n} \sqrt{p_i q_i} \qquad (3)$$

In another arrangement, a vector is constructed from each histogram and the visual difference is the Euclidean distance between vectors. That is, given two histograms each with n bins, if corresponding bins from each histogram are denoted $p_i$, and $q_i$, the Euclidean distance d is given by:

$$d = \sqrt{\sum_{i=1}^{n} (p_i - q_i)^2} \qquad (4)$$

The dimensions of the grid regions within each bounding box are proportional to the dimensions of the bounding box. Also, each bounding box contains the same configuration of grid regions. Hence, corresponding grid regions of different detections may be of different size. As a result, the histograms may be computed from data sets of different sizes. In one arrangement, the concatenated histograms are normalised before computing the visual difference.

Figure 9:
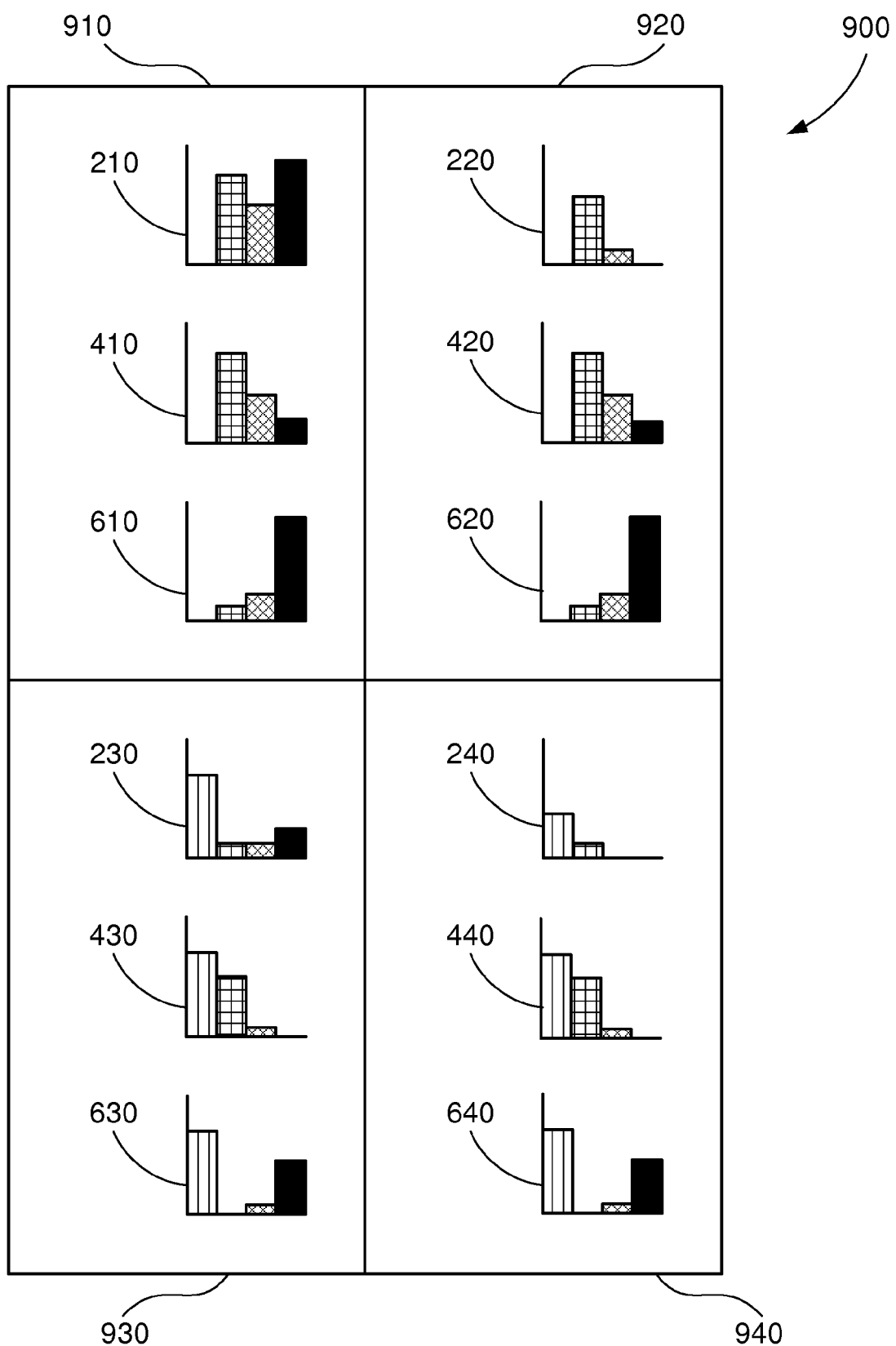
FIG. 9 shows a second arrangement of a multi-modal signature where each grid region contains independent sets of modes.

FIG. 9 shows a second arrangement of a multi-modal signature 900. The multi-modal signature 900 contains multiple modes for each grid region. The three modes of a top-left grid region 910 are the histogram of the top-left grid region of the side view of the person 210, the histogram of the top-left grid region of the front view of the person 410, and the histogram of the top-left grid region of the back view of the person 610. The dimensions of corresponding grid regions from different frames may be different, however, it is only important that the histograms are computed from the same relative grid region within the bounding box.

The three modes of a top-right grid region 920 are the histogram of the top-right grid region of the side view of the person 220, the histogram of the top-right grid region of the front view of the person 420 and the histogram of the top-right grid region of the back view of the person 620.

The three modes of a bottom-left grid region 930 are the histogram of the bottom-left grid region of the side view of the person 230, the histogram of the bottom-left grid region of the front view of the person 430 and the histogram of the bottom-left grid region of the to back view of the person 630.

The three modes of a bottom-right grid region 940 are the histogram of the bottom-right grid region of the side view of the person 240, the histogram of the bottom-right grid region of the front view of the person 440 and the histogram of the bottom-right grid region of the back view of the person 640.

In this second arrangement of a multi-modal signature, the visual difference between the multi-modal signature and a representative signature exemplifying a single appearance of a detection is computed in two steps. First, for each grid region 910, 920, 930 and 940 of the multi-modal signature 900, the mode of the grid region with the lowest visual difference to the corresponding region of the representative signature is determined. Second, these lowest visual difference modes are concatenated to produce a composite concatenated histogram. Then, the visual difference between the multi-modal signature and the representative signature is the visual difference between the composite concatenated histogram and the representative signature. In one arrangement, the visual difference between the composite concatenated histogram and the representative signature is the Bhattacharyya coefficient. In another arrangement, a vector is constructed from each histogram and the visual difference is the Euclidean distance between vectors. An advantage of this second arrangement is that the composite concatenated histogram can represent combinations of previously seen views that have not since been seen at a single instant. This allows for more accurate recognition of objects.

In one embodiment, statistics are associated with each mode, and may include, for example, temporal information. Such statistics can be used for management of the modes, for example by triggering an event. Management of the modes may include, for example, mode deletion. One statistic is the frame number of a frame in which the mode was created (the creation frame). Another statistic is the frame number of a frame in which the mode was most recently used in computing the visual difference with an associated object (the most recent association frame). Yet another statistic is the number of frames in which the mode has been used in computing the visual difference with an associated object, since the creation frame (the association count). The actual statistics associated with a mode will depend on the particular application to which an embodiment of the present disclosure is applied.

[Tracks]

A track is an ordered sequence of identifiers of a real-world object over time, derived from the detections of the real-world object that have been extracted from frames of one or more frame sequences. In one arrangement, the identifier of a real-world object is comprised of the frame number and the one or more identifiers of the detections in that frame corresponding to the real-world object. In another arrangement, the identifiers are the positions of the spatial representations of the detections in a list of detections. In another arrangement, the identifiers are comprised of the frame numbers in which the object is visible as it moves through the video and the corresponding detection data. In another arrangement, the identifiers are the detection data. In another arrangement, the identifiers are comprised of the positions of the detections comprising the track.

[Tracker]

A tracker maintains a collection of tracks. A track may be maintained over multiple frames and multiple sequences of frames. For example, a track may be maintained over a plurality of frames in a single sequence of frames. In another example, a track may be maintained over multiple sequences of frames, such as may occur when an object is tracked by multiple cameras.

For each frame that is being processed, the tracker creates an expected spatial representation, which will be referred to as an expectation, for each track based on the track's attributes. The track from which the expectation was computed is referred to as the expectation's source track. For any given frame, there may be zero, one, or multiple tracks associated with the frame.

In one arrangement, the attributes of an expectation are the size and the position of the tracked object. Given an expectation of a track, and a set of spatial representations of detections in a frame, the tracker can compute a spatial difference for pairs of expectations and detections. The computation of the spatial difference is described in more detail later.

In one arrangement, predetermined variances are provided in order to compute a gating distance. In this arrangement, the predetermined variances are computed prior to performing the tracking method by firstly generating detections from pre-recorded image sequences that together form a training set. Associations are manually formed between complete, non-fragmented detections from consecutive frames of the training set. These associations are joined together temporally to form tracks. Then, for each track beginning from the third frame, an expectation is produced, for example, based on a velocity of the to tracked object in the two previous frames. The spatial representation of each expectation is compared to the corresponding spatial representation of the detection in the same frame of the training set to determine the difference of each component. The components can include, for example, but are not limited to, differences in horizontal location, vertical location, width, height, or any combination thereof. From these differences, statistical variances are computed representing an error in each component.

Let $\hat{x}$ denote a statistical variance of a horizontal distance between the centre of the spatial representation of the detection and a centre of the spatial representation of the expectation. In one arrangement, $\hat{x}$ is computed by first determining the difference between the horizontal location of the spatial representation of the expectation and the horizontal location of the spatial representation of the detection. This step is repeated for multiple associated detections and expectations. Then, each difference is squared, and the squares are summed. Finally, the sum of the squares is divided by the number of differences. The statistical variance $\hat{y}$ of the vertical distance is computed in a similar manner, using the difference in the vertical locations. The statistical variance $\hat{w}$ of the difference in the width is computed in a similar manner, using the difference in widths. The statistical variance $\hat{h}$ of the difference in the height is computed in a similar manner, using the difference in heights.

Then, given the predetermined variances, the spatial difference s may be computed using the Kalman gating function:

$$s = \frac{(x\_representation - x\_expectation)^2}{\hat{x}} + \frac{(y\_representation - y\_expectation)^2}{\hat{y}} + \frac{(w\_representation - w\_expectation)^2}{\hat{w}} + \frac{(h\_representation - h\_expectation)^2}{\hat{h}} \quad (5)$$

This spatial difference function produces a numerical result which is small if the spatial representation of the detection and the expectation are similar, and large if the spatial representation of the detection and the expectation are dissimilar. The spatial difference has some important properties. Statistically, the difference between the expectation and the spatial representation of a corresponding detection should be within approximately one standard deviation. Dividing the square of the difference by the variance for each component scales the error such that the contribution to the spatial to difference is 1.0 unit for each component. The calculated spatial difference should be less than the number of measured components if the spatial representation of the detection corresponds to the spatial representation of the expectation. In this arrangement, the number of measured components is 4.0 and is a predetermined spatial difference threshold. Where the properties of a system have been measured to give the variances, the value of the predetermined spatial difference threshold is known to be optimal, in the Bayesian sense.

Following in the spirit of the spatial difference function, the visual difference between a multi-modal signature of a track (known as a track signature) and the signature of the detection (known as a representative signature) is scaled such that the visual difference should be less than a predetermined visual difference threshold for a valid combination of the track signature and a representative signature. In one arrangement, the predetermined visual difference threshold is 1.0. In one implementation, the track signature is derived from at least one object detected in at least one frame acquired by a first image capturing device, and the frame in which the object is detected is acquired by a second image capturing device. In another implementation, the track signature is derived from information derived from at least one frame acquired (captured) by a single image capturing device.

To compute a combined difference between a detection and the expectation of a track, the spatial difference is added to the visual difference. That is:

$$\text{combined\_difference} = \text{spatial\_difference} + \text{visual\_difference} \quad (6)$$

The combined difference should be less than a predetermined combined difference threshold, for example, 5.0, for a valid combination of a track and a detection.

Figure 10:
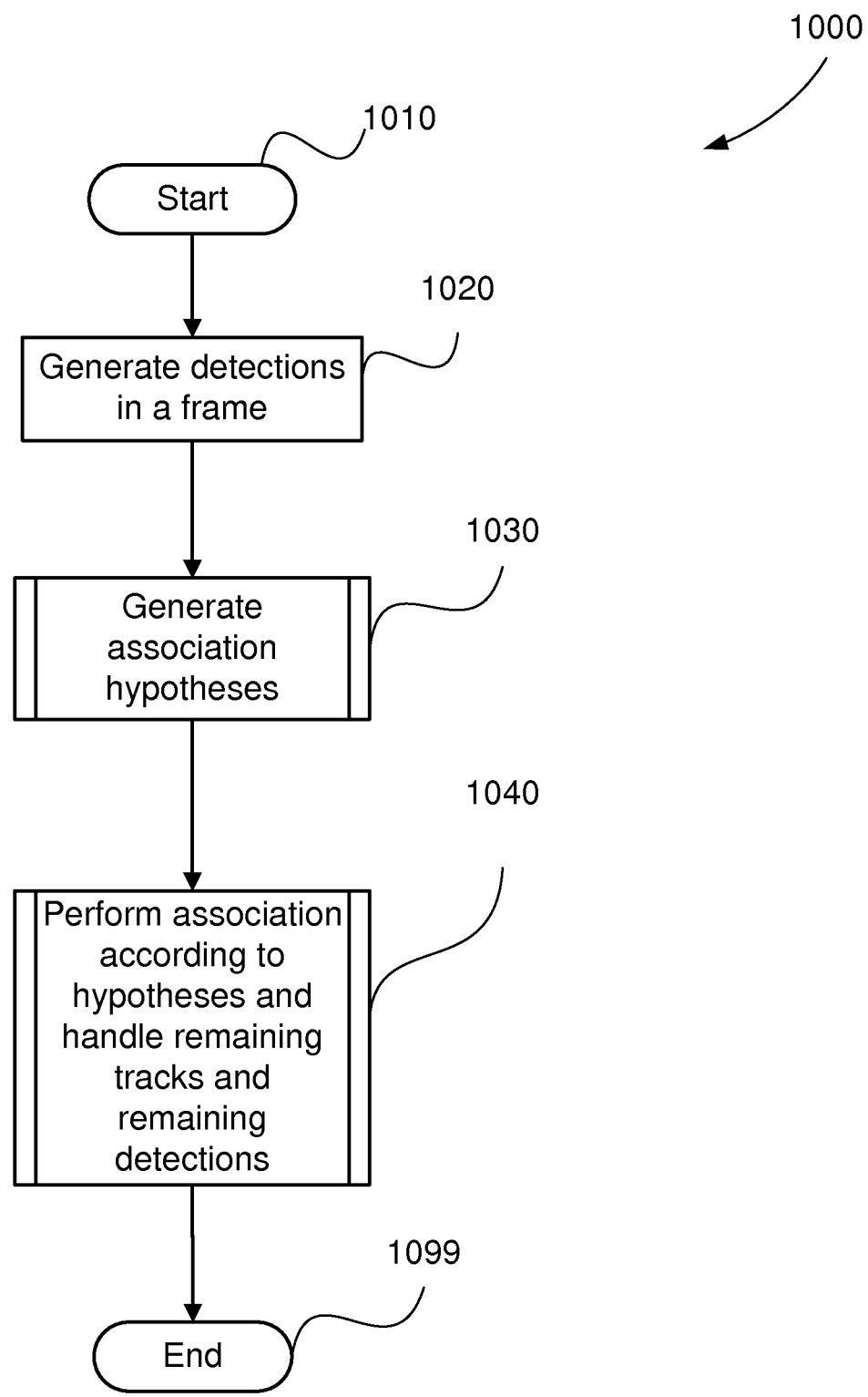
FIG. 10 is a flow diagram of the tracking method as applied to one frame of the image to sequence.

FIG. 10 is a flow diagram of a data processing architecture and framework of the module performing appearance-invariant tracking 1000 in each frame. Processing starts at a Start step 1010, and control passes to step 1020, which activates a detection generation module to generate detections from a video frame that is being analyzed. In one implementation, for example, the detection generation module utilizes a foreground separation method using background modeling to generate the detections. These detections are passed to an association hypothesis generator, which in step 1030 creates association hypotheses. Association hypotheses are proposals of which detections and combinations of detections could possibly be associated with which tracks. Control passes to step 1040, in which a data association module relates the detections to existing object tracks and updates the object tracks accordingly. The data association module 1040 also handles remaining detections and existing object tracks that could not be associated or updated. The process ends at End step 1099 upon completion of the data association module.

[Hypothesis Generation]

When a tracker maintains a single track and the tracker is provided with a plurality of potential fragments, a combination of the plurality of potential fragments can be associated with the single track. In one implementation, it is also possible to associate a single detection with a plurality of tracks. Matching many tracks to one detection is valuable when, for example, two objects are being tracked, and one occludes the other resulting in a single detection, with the single detection being larger than either expected individual detection. A similar process to matching fragments to a track is then followed, but instead with tracks being matched against a compound object. However, a much more complex situation arises when the tracker maintains multiple tracks and is provided with multiple detections. In particular, a single real-world object sometimes corresponds to multiple detections, for example due to part of the object being occluded, or a portion of the object blending with the foreground.

In one implementation, matching multiple tracks to a single detection results in the creation of a mergetrack—an additional track for the merged detection. Subsequent detections will either be associated with the individual contributor tracks of the mergetrack, or be associated with the same combination of tracks as before, or be associated with the mergetrack itself, depending on the spatial similarity scores. In one implementation, the mergetrack is discarded if the contributor tracks are subsequently tracked independently, thereby showing that a temporary occlusion had occurred. In one implementation, a mergetrack is continued when the same tracks combine repeatedly. However, if incoming detections match well with the mergetrack itself, then the corresponding contributing tracks are terminated and considered to be merged. In one implementation, a mergetrack may be associated with a plurality of detections, thereby matching many tracks to many detections, where appropriate.

Figure 11:
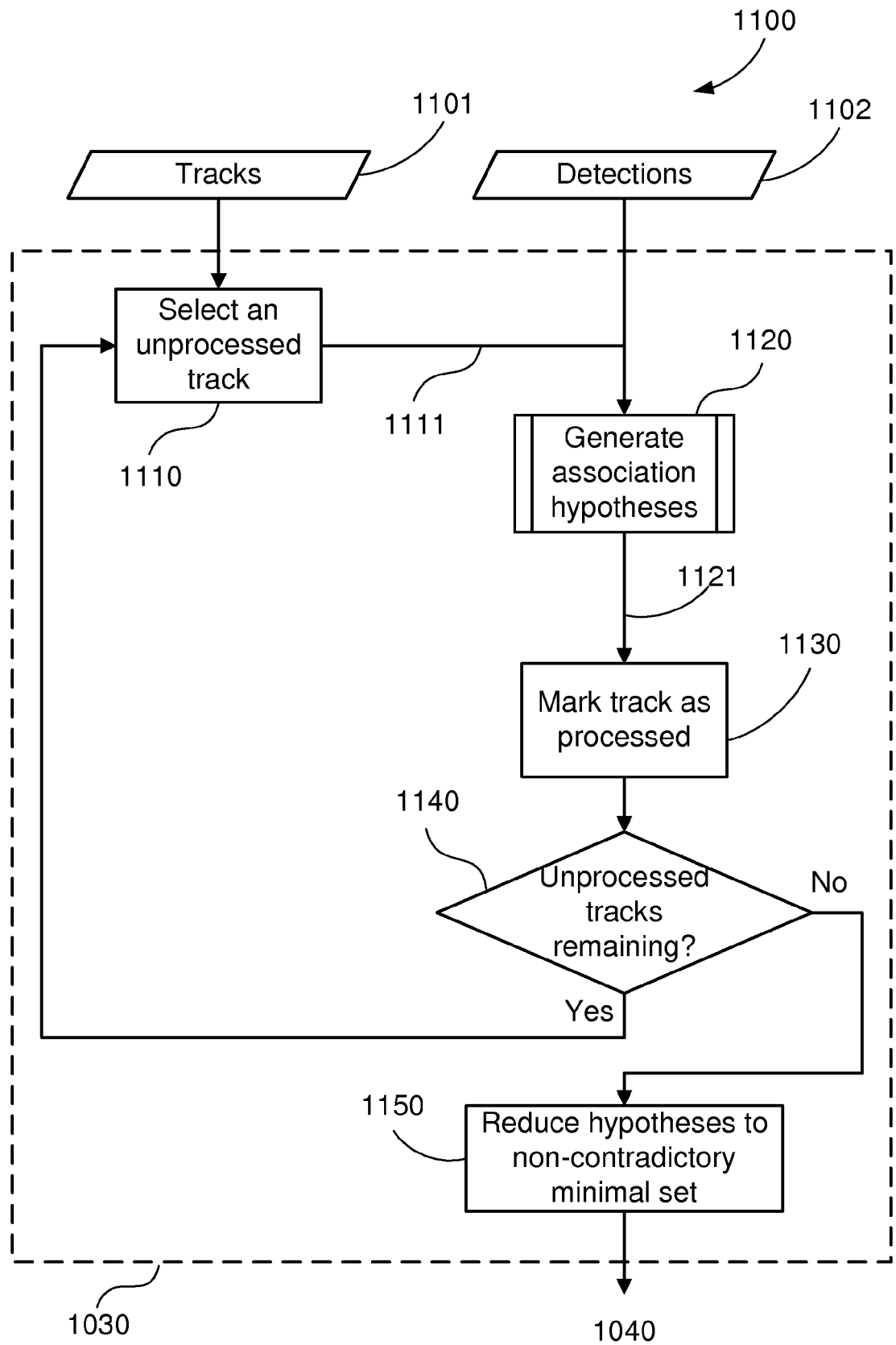
FIG. 11 is a flow diagram of one step of the association hypothesis generation module used to generate association hypotheses of combinations of incoming detections with tracks maintained by a tracking system.

FIG. 11 is a flow diagram detailing steps of the data association module 1000, as used in one arrangement. The inputs to the data association module 1000 are tracks 1101 managed by the tracker, and detections 1102 generated by a detection generation module. The procedure of associating detections to tracks first involves generating association hypotheses. The tracks 1101 are provided as an input to a step 1110, in which each track is processed independently. Step 1110 selects an unprocessed track 1111 from the tracks 1101 as an input to the association hypothesis generation module in step 1120. The detections 1102 are provided as a second input to the hypothesis generation module in step 1120.

Figure 12:
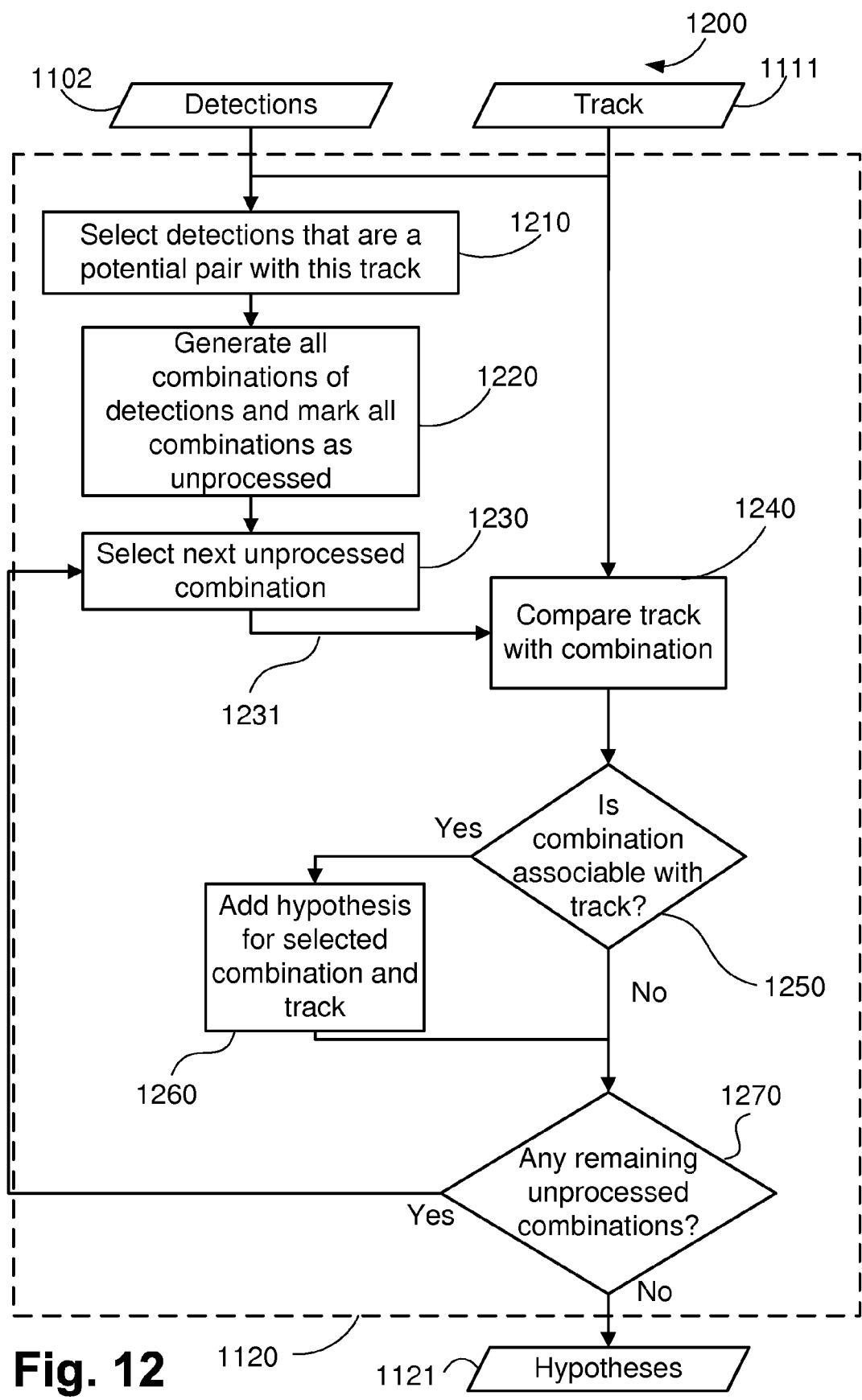
FIG. 12 is a flow diagram of a data association module that associates incoming detections with tracks maintained by a tracking system.

FIG. 12 is a flow diagram 1200 illustrating in detail an arrangement of the association hypothesis generation module 1120. The step has two inputs: the detections 1102 and a selected unprocessed track 1111. First, in step 1210, the supplied detections are reduced to a set of detections for the track that is being processed. Possible combinations of detections (henceforth: combinations) are then generated by module 1220. Each combination is a unique subset of the detections, where the subset may contain one or more potential fragments. The subset may be an improper subset of the set of combinations.

Each combination is processed in turn. Step 1230 selects an unprocessed combination 1231. Then, a track-combination comparison module 1240 determines if the selected combination 1231 is potentially associable with the track 1111. First, a minimal bounding box enclosing the combination of the spatial representations of the detections is determined. In the case of a combination containing a single detection, the bounding box enclosing the combination is the bounding box of the spatial representation of the detection itself. The combination also has a visual representation. In one arrangement, the visual representation of the combination is computed by overlaying the combination with the minimal bounding box enclosing the combination. The visual representation of the region enclosed by the bounding box (i.e., the combination) is then computed. In the case of a combination containing a single detection, the visual representation of the combination is the visual representation of the single detection. In another arrangement, the visual representation of the combination is computed by averaging the visual representations of the detections within the combination. In yet another arrangement, a weighted average is used, where the weights are derived from the positions of the detections within the bounding box, or the area of the detections.

In one arrangement of track-combination comparison module 1240, a spatial difference and a visual difference between the track and the combination are computed. The minimal bounding box is used in computing the spatial difference.

Next, association decision step 1250 uses the spatial difference and the visual difference between the track and the combination to decide whether the combination can be associated with the track. The combined difference between the track and the combination can be computed by summing the spatial difference and the visual difference. In one arrangement, if the combined difference is less than the predetermined combined difference threshold, or if the spatial difference is less than the predetermined spatial difference threshold, Yes, control passes to step 1260, which creates an association hypothesis for the combination 1231 and the track 1111 and adds the association hypothesis to a list of association hypotheses 1121. Control then passes to decision step 1270. Returning to step 1250, if neither test is satisfied, No, no action is taken. That is, no association hypothesis is created and control passes to decision step 1270. In practice, this means that if a combination resembles a track based on spatial characteristics, or based on combined spatial and visual characteristics, the combination is potentially associable with the track.

Decision step 1270 performs a test to determine whether the association hypothesis generation module 1120 has further unprocessed combinations to consider 1270. If there are further unprocessed combinations to consider, Yes, a sequence of three steps are repeated by returning control to step 1230. The first step is selecting a combination 1230. The second step is performing the comparison between the combination 1231 and the track 1211. The third step is deciding whether to create a hypothesis 1260 for the track and combination based on the comparison 1250. If there are no further unprocessed combinations to consider at step 1270, control passes to step 1121, which is an output set of association hypotheses.

Returning to FIG. 11, step 1120 produces an output set of association hypotheses for combinations of detections 1102 and the track 1111. The set of association hypotheses are presented to step 1130, which marks the track 1111 as having been processed. Control passes to decision step 1140 to determine whether there are any unprocessed tracks remaining. If in step 1140, it is determined that there are remaining tracks to be processed, Yes, the process repeats from step 1110. If there are no remaining tracks to be processed, No, control passes to step 1150, which reduces the hypotheses to a non-contradictory minimal set, and the process of FIG. 11 concludes by returning control to step 1040 of FIG. 10.

[Hypothesis Reduction]

Upon all tracks being marked as processed, the decision step 1140 in FIG. 11 passes control to step 1150 which is used to process the association hypotheses generated by the association hypothesis generation module 1120. As the association hypotheses were generated independently for each expectation, it is possible that some association hypotheses attempt to associate the same detection (or even the same combination of detections) to different tracks. Such contradictions may be undesirable. Thus, in one arrangement, the association hypothesis reduction process 1150 is used to reduce the set of association hypotheses to an optimal set. In the optimal set, each detection appears in at most one association hypothesis, and each track appears in at most one association hypothesis. In one arrangement, the Global Nearest Neighbour approach is used to reduce the set of association hypotheses. Global Nearest Neighbour is an iterative greedy algorithm that, in one arrangement, selects the association hypothesis with the lowest combined difference from the input set and places the selected association hypothesis in the optimal set. All other association hypotheses that contain the same track or any of the detections represented by the selected association hypothesis are then deleted from the input set of association hypotheses. This is because selecting the other association hypotheses later would create contradictions. In another arrangement, every possible combination of association hypotheses is evaluated to determine procedurally an optimal non-contradictory subset according to a sum of combined differences. However, evaluating every possible combination of association hypotheses can be computationally expensive.

The association hypothesis reduction process 1150 results in a non-contradictory subset of association hypotheses that is a subset of the association hypotheses resulting from the association hypothesis generation module 1120. In the non-contradictory subset of association hypotheses, each detection appears in at most one association hypothesis and each track appears in at most one association hypothesis.

[Association]

Figure 13:
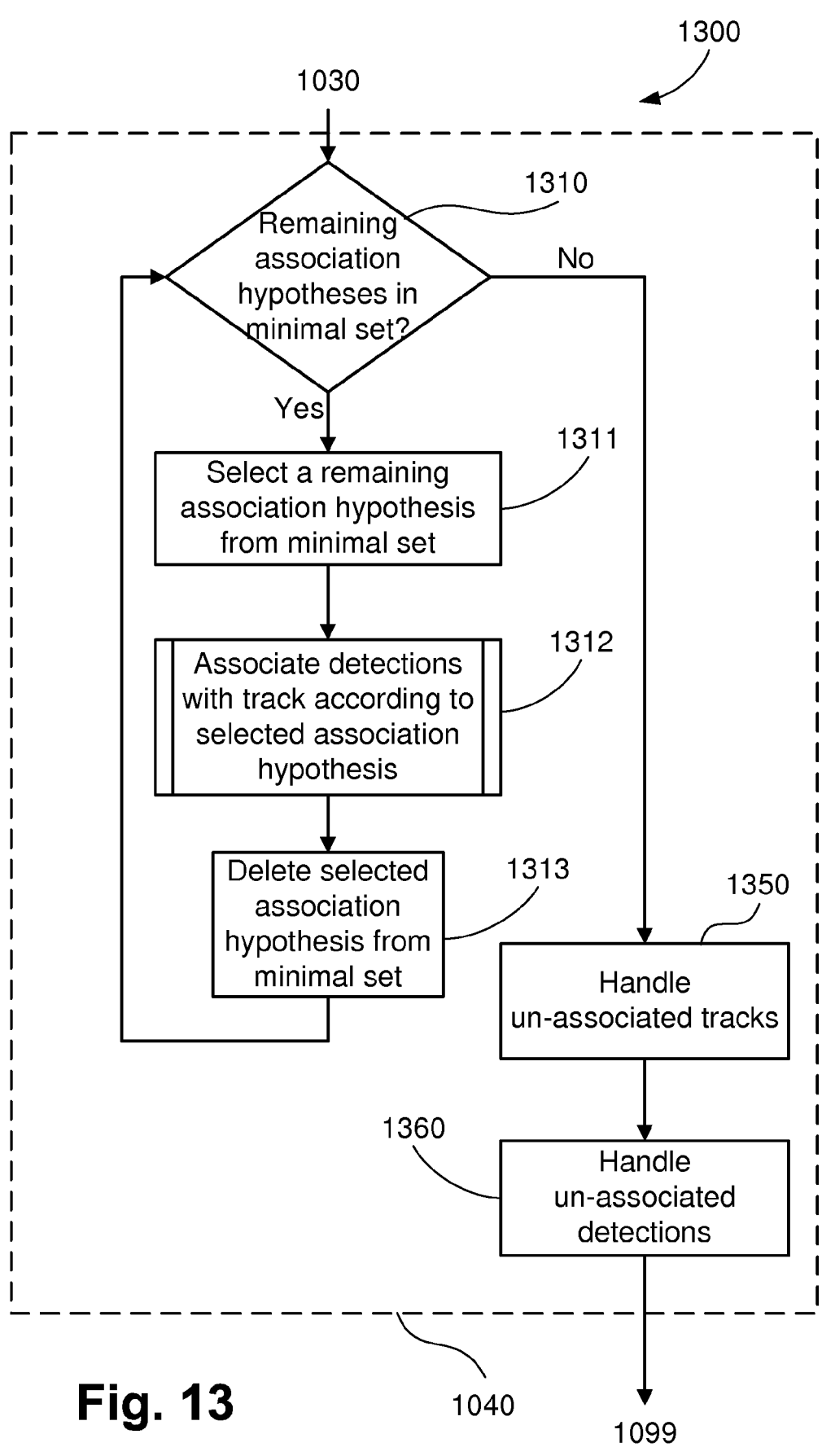
FIG. 13 is a flow diagram of a module used to associate incoming detections with tracks maintained by a tracking system, and also to process remaining unprocessed tracks and remaining unprocessed detections.

Upon completion of the association hypothesis reduction process 1150 of reducing the association hypotheses to a non-contradictory subset, the tracking system updates the tracks in the association hypothesis processing module 1040. FIG. 13 is a flow diagram 1300 illustrating a procedure that handles this subset of association hypotheses, and also handles tracks and detections which are not covered by the association hypotheses. First, a test is performed in decision step 1310 to determine whether there are association hypotheses remaining in the minimal non-contradictory subset to be processed. If there are no remaining association hypotheses in the minimal set, No, control passes to step 1350, which handles the unassociated tracks. Control passes from step 1350 to step 1360, which handles unassociated detections and the flow diagram 1300 ends by passing control to step 1099 of FIG. 10.

Returning to step 1310, if there is a remaining association hypothesis in the minimal set, Yes, control passes to step 1311, which selects an association hypothesis from the minimal set of non-contradictory association hypotheses. Then, in detection/track association step 1312, the detections represented in the selected association hypothesis are associated with the track 1111 represented in the association hypothesis. Control passes to step 1313, which deletes the selected association hypothesis from the minimal set, in order to avoid duplicate associations. Upon deletion of the association hypothesis, the process returns to the decision step 1310 and processes further association hypotheses, if available.

[First Arrangement of Detection/Track Association]

Figure 14:
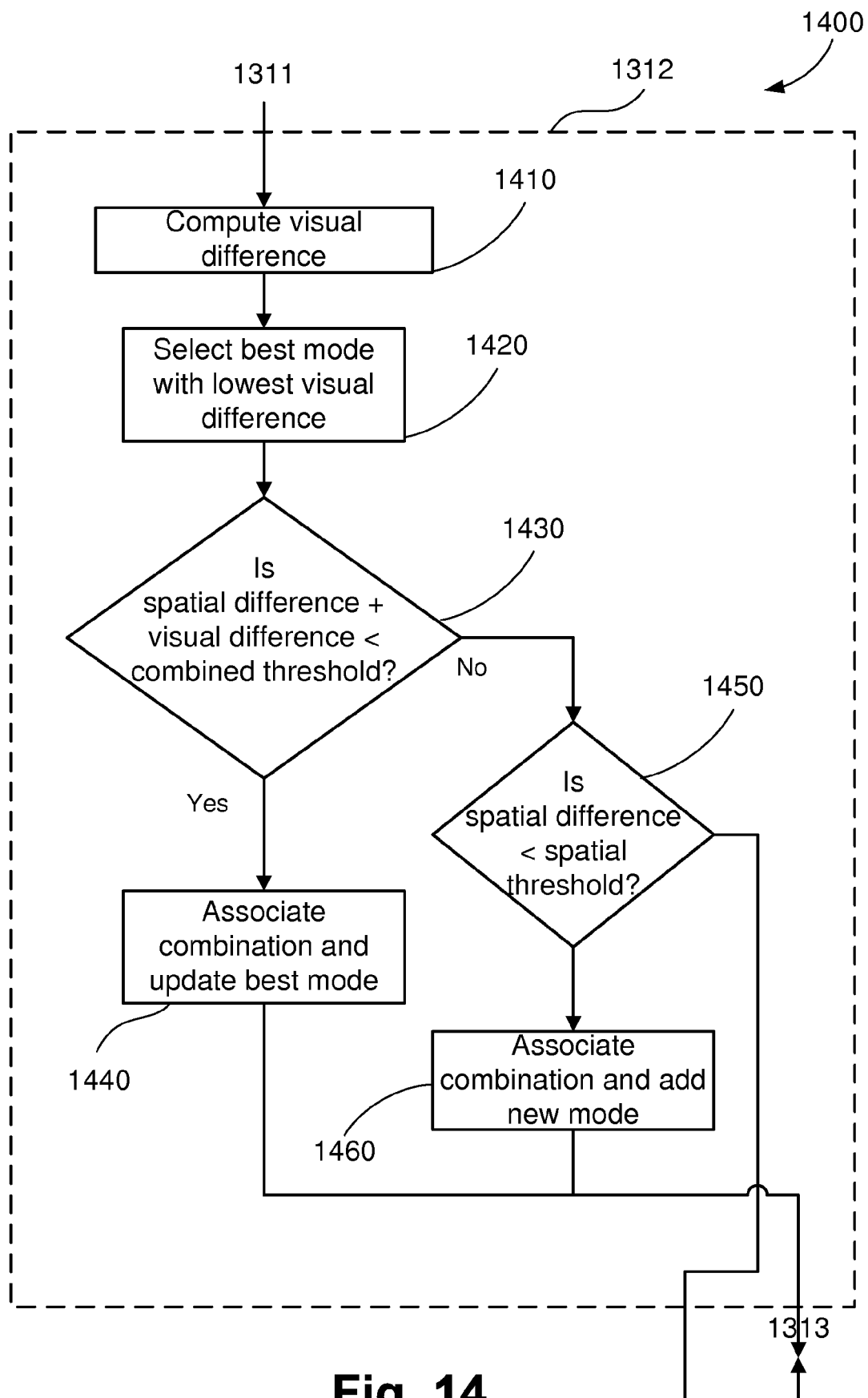
FIG. 14 is a flow diagram of one arrangement of the process used to associate an object with a track and update the multi-modal signature stored within the track.

FIG. 14 is a flow diagram 1400 illustrating a first arrangement of the detection/track association step 1312 of FIG. 13. In the first arrangement, each mode of the multi-modal signature is a concatenated histogram. First, step 1410 computes a visual difference between each mode of the track signature and the representative signature of the combination. Step 1420 selects the mode resulting in the lowest visual difference and marks the selected mode as the best mode. Then, in decision step 1430, if the combined difference is less than the predetermined combined difference threshold, Yes, then first association module 1440 is called. In first association module 1440, the combination is associated with the track and the statistics of the best mode are updated. In one arrangement of updating the statistics, the association count is increased by one and the most recent frame is set to be equal to the current frame. In one arrangement of updating the best mode, the best mode of the multi-modal signature is combined with the representative signature using a weighted average. In another arrangement of updating the best mode, the best mode of the multi-modal signature is not modified. In yet another arrangement of updating the best mode, the best mode of the multi-modal signature is updated only if the visual difference between resulting updated best mode and all other modes is above a predetermined mode distance threshold, e.g., 1.0. Applying the predetermined mode distance threshold ensures that each mode represents significantly different appearances.

In the first arrangement, if in the first decision 1430 the combined difference is greater than or equal to the predetermined combined difference threshold, No, control passes to a second decision 1450. If in second decision 1450 the spatial difference is less than the predetermined spatial difference threshold, Yes, control passes to step 1460, which associates the combination with the track and a new mode is created in the multi-modal signature using the representative combination. In one arrangement, the maximum number of modes is a constant, in which case it is sometimes necessary to delete a mode before creating a new mode. The stored statistics of each mode are used in determining which mode should be deleted. In one arrangement, a survival score is computed. First, an existence time is determined by subtracting a creation frame from a frame number of a current frame. Next, the inactivity time is determined by subtracting the most recent association frame from the frame number of the current frame. Then, the survival score s is the association count divided by the product of the existence time and the inactivity time, that is:

$$s = \frac{\text{association\_count}}{\text{existence\_time} \times \text{inactivity\_time}} \quad (7)$$

The mode with the lowest survival score is then deleted. In creating the new mode, the statistics of that mode are initialized. The association count of the new mode is set to one. The creation frame of the new mode and the last seen frame of the new mode are set to the frame number of the current frame.

If in the second decision 1450 the spatial difference is not less than the predetermined spatial difference threshold, No, the combination cannot be associated with the track and the association hypothesis is discarded. Control passes to step 1313 of FIG. 13.

[Second Arrangement of Detection/Track Association]

Figure 15:
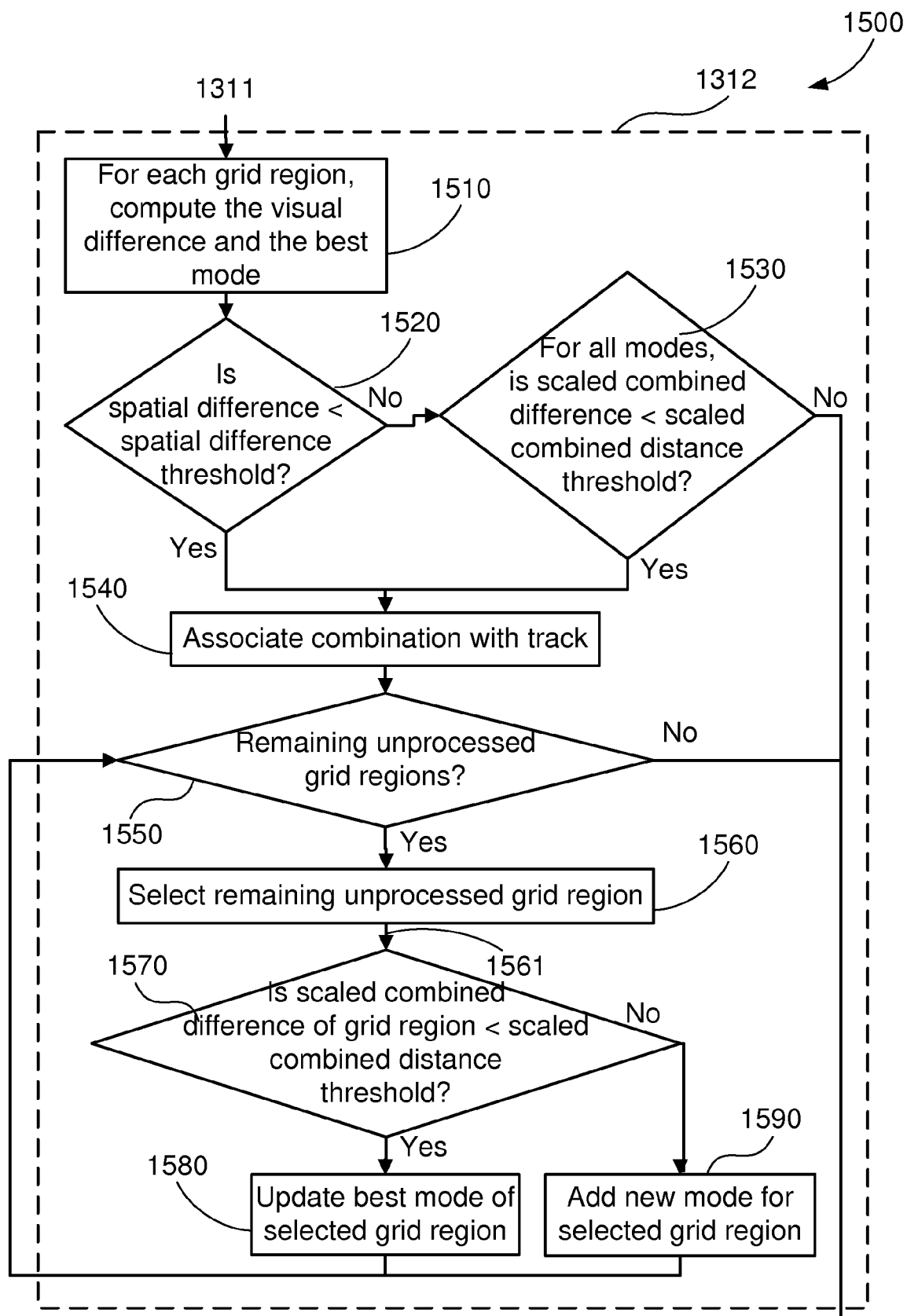
FIG. 15 is a flow diagram of another arrangement of the process used to associate an object with a track and update the multi-modal signature stored within the track.

FIG. 15 is a flow diagram 1500 illustrating a second arrangement of the to detection/track association step 1312 of FIG. 13. In the second arrangement, each grid region within the bounding box of the track contains multiple modes. The flow diagram 1500 receives as an input the output of step 1311 from FIG. 13. Control passes to step 1510, which computes a visual difference for each grid region. For each grid region, the mode of the grid region resulting in the lowest visual difference is selected and marked as the best mode of that grid region. Next, in a first threshold test 1520, if the spatial difference between the track and the combination is less than the predetermined spatial difference threshold, Yes, control passes to association module step 1540. If in the first threshold test 1520, the spatial difference between the track and the combination is more or equal to the predetermined spatial difference threshold, No, control passes to a second threshold test 1530.

In the second threshold test 1530, for each mode, the scaled combined difference between the mode and the representative signature is computed. The scaled combined difference of a grid region is a weighted sum of the spatial difference between the combination and the track, and the visual difference between the best mode of the grid region and the corresponding grid region of the combination. The visual difference component is multiplied by a predetermined visual difference multiplier. The effect of multiplying by the predetermined visual difference multiplier is that the visual difference representing the same object within the grid region is less than or equal to 1.0, where the mode of the grid region corresponds to the grid region of the combination. In one arrangement, the visual difference multiplier is 1.0. In another arrangement, the visual difference multiplier is dependent on the number of grid regions and the method of computing the visual difference. If in second threshold test 1530, the scaled combined distance is less than a predetermined scaled combined distance threshold, Yes, control passes to the association module 1540. If the scaled combined distance is greater than or equal to the predetermined scaled combined distance threshold, No, the detection/track association step 1312 terminates and control passes to step 1313 of FIG. 13. In one arrangement, the predetermined scaled combined distance threshold is 5.0. In another arrangement, the predetermined scaled combined distance threshold is equal to a predetermined visual difference threshold multiplied by a predetermined visual difference multiplier, added to the predetermined spatial difference threshold.

In association module 1540, the combination of detections are associated with the track. Then, the mode data of each of the grid regions are modified. In remaining unprocessed grid region determination step 1550, a test is performed to determine if there are any grid regions that have not had mode data modified. If remaining unprocessed grid region determination step 1550 determines that there are grid regions that have not had mode data modified, Yes, selection step 1560 is executed. In selection step 1560, one of the grid regions that has not had mode data modified is selected 1561.

Next, grid region threshold test 1570 is performed for the selected unprocessed grid region 1561. In grid region threshold test 1570, if the scaled combined difference of the grid region 1561 is less than the predetermined combined difference threshold, Yes, mode update step 1580 is performed. In mode update step 1580, the best mode of the selected grid region is updated. In one arrangement, the best mode of the selected grid region is combined with the representative signature using a weighted average. In another arrangement, the best mode of the selected grid region is not modified. In yet another arrangement of updating the best mode, the best mode of the selected grid region is updated only if the visual difference between resulting updated best mode and all other modes is above a predetermined mode distance threshold, e.g., 1.0. Also in mode update step 1580, the mode statistics of the best mode are updated. In one arrangement, the association count is increased by one and the most recent frame is set to be equal to the current frame.

Returning to grid region threshold test 1570, if the scaled combined difference of the grid region 1561 is greater than or equal to the predetermined combined difference threshold, No, mode creation step 1590 is performed. In mode creation step 1590, a new mode is created for the grid region using the signature of the corresponding grid region of the combination. In one arrangement, the maximum number of modes is a constant, in which case it is sometimes necessary to delete a mode before creating a new mode. The stored statistics of each mode are used in determining which mode should be deleted. In one arrangement, a mode survival score is computed. First, the existence time is determined by subtracting the creation frame from the frame number of the current frame. Next, an inactivity time is determined by subtracting the most recent association frame from the frame number of the current frame. Then, the survival score s is the association count divided by the product of the existence time and the inactivity time, that is:

$$s = \frac{association\_count}{existence\_time \times inactivity\_time} \quad (8)$$

The mode with the lowest mode survival score is then deleted from the multi-modal signature. In creating the new mode, the statistics of that mode are initialized. The association count of the new mode is set to one. The creation frame of the new mode and the last seen frame of the new mode are set to the frame number of the current frame.

Upon completing mode update step 1580 or mode creation step 1590, control returns to remaining unprocessed grid region determination step 1550. If remaining unprocessed grid region determination step 1550 determines that there are further grid regions to process, Yes, the above process is repeated. If remaining unprocessed grid region determination step 1550 determines that there are no more grid regions to process, No, detection/track association step 1312 is completed.

[Handling Un-Associated Tracks]

There may be some remaining tracks that are not associated with any detections according to the minimal set of non-contradictory association hypotheses. Further processing can be performed on these remaining tracks. In one arrangement, the additional un-associated track processing step 1350 is executed to process any tracks which are not associated with any detections by any of the association hypotheses selected in step 1311 of FIG. 13.

In one arrangement, the tracker handles the case where a track is not associated with any detections for a number of consecutive frames. The tracker can produce expectations in later frames. In one arrangement, the multi-modal signature of the track is not modified when the track is not associated with a detection in a frame. In another arrangement, the multi-modal signature of the track is updated using a prediction method when the track is not associated with a detection in a frame. In one arrangement, the prediction method updates the most recently associated mode using the most recently associated representative signature.

The number of consecutive frames where no detections have been associated with the track may exceed a predetermined un-associated track existence threshold, say 5. If the un-associated track existence threshold is exceeded for a given track, the tracker will no longer attempt to associate detections with the track.

False positive detections may be made on occasion, in a manner whereby typically false positive detections are only generated for a small number of consecutive frames. In one arrangement, tracks that contain a number of associations below a predetermined false to positive track length threshold, say 5 frames, are revoked. In one arrangement, revoking means that the tracks will not be processed in future frames. In another arrangement, the tracker deletes the track completely.

[Handling Un-Associated Detections]

Similarly to the un-associated track processing step 1350, there may be some remaining detections that are not associated with any tracks according to the minimal set of association hypotheses. In one arrangement, these remaining detections are processed by the un-associated detection processing module 1360. In one arrangement, a new track is created for each remaining detection. The track signature is initialized with one mode, with the mode equal to the representative signature. This process is incorporated into the un-associated detection processing module 1360. In another arrangement, a new track is created only if the size of the spatial representation of a detection is above a predetermined detection size threshold. An example of the predetermined detection size threshold is 15 DCT blocks for a frame with dimensions of 96×72 blocks, or 100 pixels for a frame with dimensions 320×240 pixels. In another arrangement, the detection size threshold is a percentage, say 0.2%, of the number of blocks or pixels in the frame.

[System Implementation]

Figure 16:
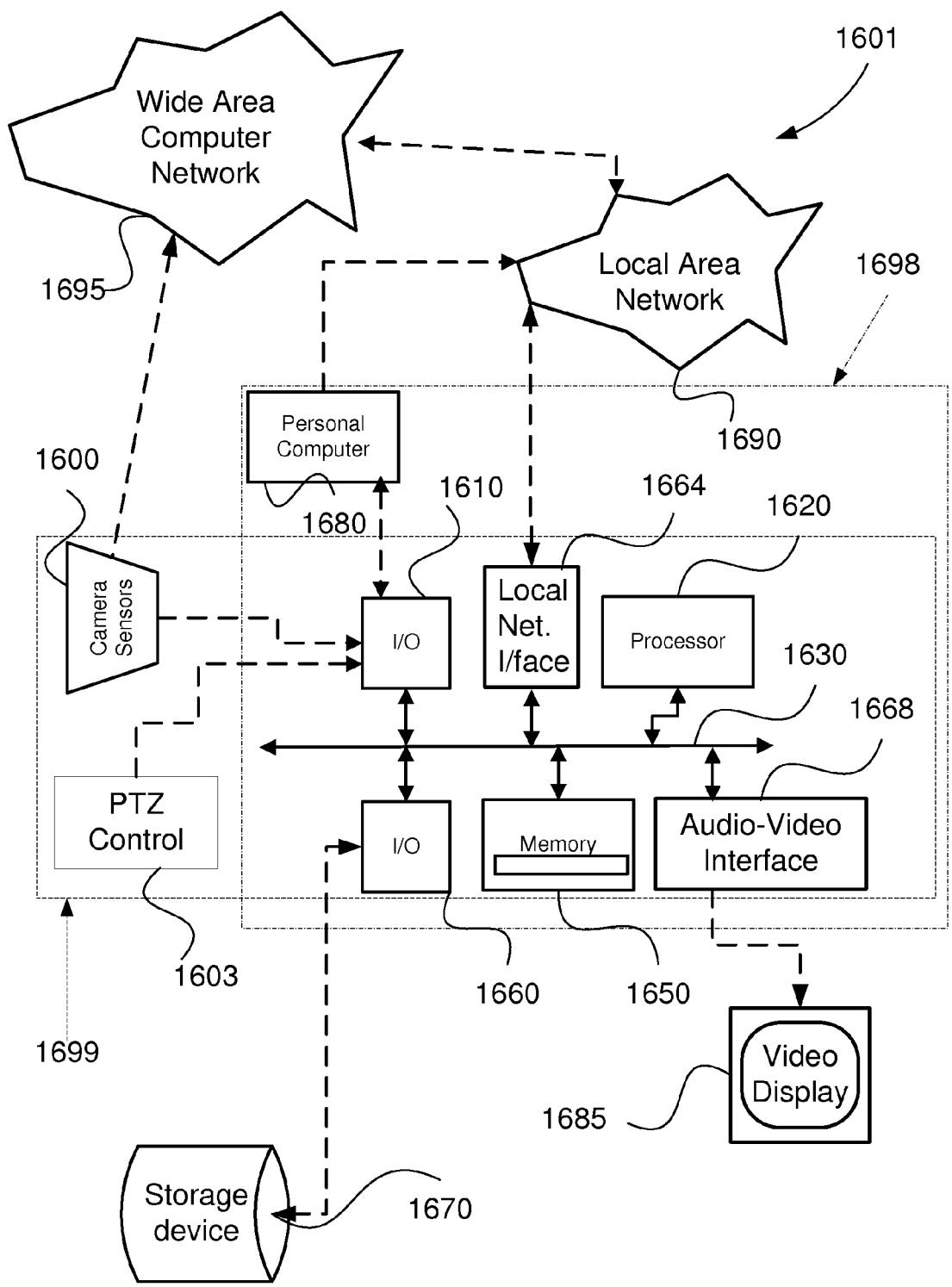
FIG. 16 is a schematic representation showing an electronic system for implementing the disclosed appearance-invariant tracking method.

FIG. 16 shows an electronic system 1601 for effecting the disclosed appearance-invariant object tracking method. Sensors 1600 are used to obtain the images of the image sequence. The sensors may represent a stand alone sensor device (i.e., detector or a security camera) or be part of an imaging device, such as camera, mobile phone etc. In one arrangement, the pan and tilt angles and the zoom of the sensors are controlled by a pan-tilt-zoom controller 1603. The remaining electronic elements 1610 to 1668 may also be part of the imaging device comprising camera sensors 1600, as indicated by dotted line 1699. The electronic elements 1610 to 1668 may also be part of a computer system that and is located either locally or remotely with respect to sensors 1600. In the case indicated by dotted line 1698, electronic elements form a part of personal computer 1680.

The transmission of the images from the camera sensors 1600 to the processing electronics 1620 to 1668 is facilitated by an input/output interface 1610, which could be a serial bus compliant with Universal Serial Bus (USB) standards and having corresponding USB connectors. Alternatively, the image sequence may be retrieved from camera sensors 1600 via Local Area Network 1690 or Wide Area Network 1695. The image sequence may also be downloaded from a local storage device (e.g. 1670), that can include SIM card, SD card, USB memory card, etc.

The images are obtained by input/output interface 1610 and sent to the memory 1650 or another of the processing elements 1620 to 1668 via a system bus 1630. The processor 1620 is arranged to retrieve the sequence of images from sensors 1600 or from memory 1650. The processor 1620 is also arranged to fetch, decode and execute all steps of the disclosed method. The processor 1620 then records the results from the respective operations to memory 1650, again using system bus 1630. Apart from memory 1650, the output could also be stored more permanently on a storage device 1670, via an input/output interface 1660. The same output may also be sent, via network interface 1664, either to a remote server which may be part of the network 1690 or 1695, or to personal computer 1680, using input/output interface 1610. The output may also be displayed for human viewing, using AV interface 1668, on a monitor 1685. Alternatively, the output may be processed further. One example of further processing may include using the output data, written back to memory 1650, memory 1670 or computer 1680, as the input to a background modelling system.

As was discussed above and indicated in FIG. 16, the above method may be embodied in various forms. In the particular form, indicated by rectangle 1699, the method is implemented in an imaging device, such as a camera, a network camera, or a mobile phone with a camera. In this case all the processing electronics 1610 to 1668 will be part of the imaging device, as indicated by rectangle 1699. As already mentioned in the above description, such an imaging device for capturing a sequence of images and tracking objects through the captured images will comprise; a sensor 1600, memory 1650, a processor 1620, an input/output interface 1610 and a system bus 1630. The sensor 1600 is arranged for capturing the sequence of images in which objects will be tracked. The memory 1650 is used for storing the sequence of images, the objects detected within the images, the track data of the tracked objects and the signatures of the tracks. The processor 1620 is arranged for receiving, from the sensor 1600 or from the memory 1650, the sequence of images, the objects detected within the images, the track data of the tracked objects and the signatures of the tracks. The processor 1620 also detects the objects within the images of the image sequences and associates the detected objects with tracks.

The input/output interface 1610 facilitates the transmitting of the image sequences from the sensor 1600 to the memory 1650 and to the processor 1620. The input/output interface 1610 also facilitates the transmitting of pan-tilt-zoom commands from the PTZ controller 1603 to the sensor 1600. The system bus 1630 transmits data between the input/output interface 1610 and the processor 1620.

[Computer Implementation]

Figure 17A:
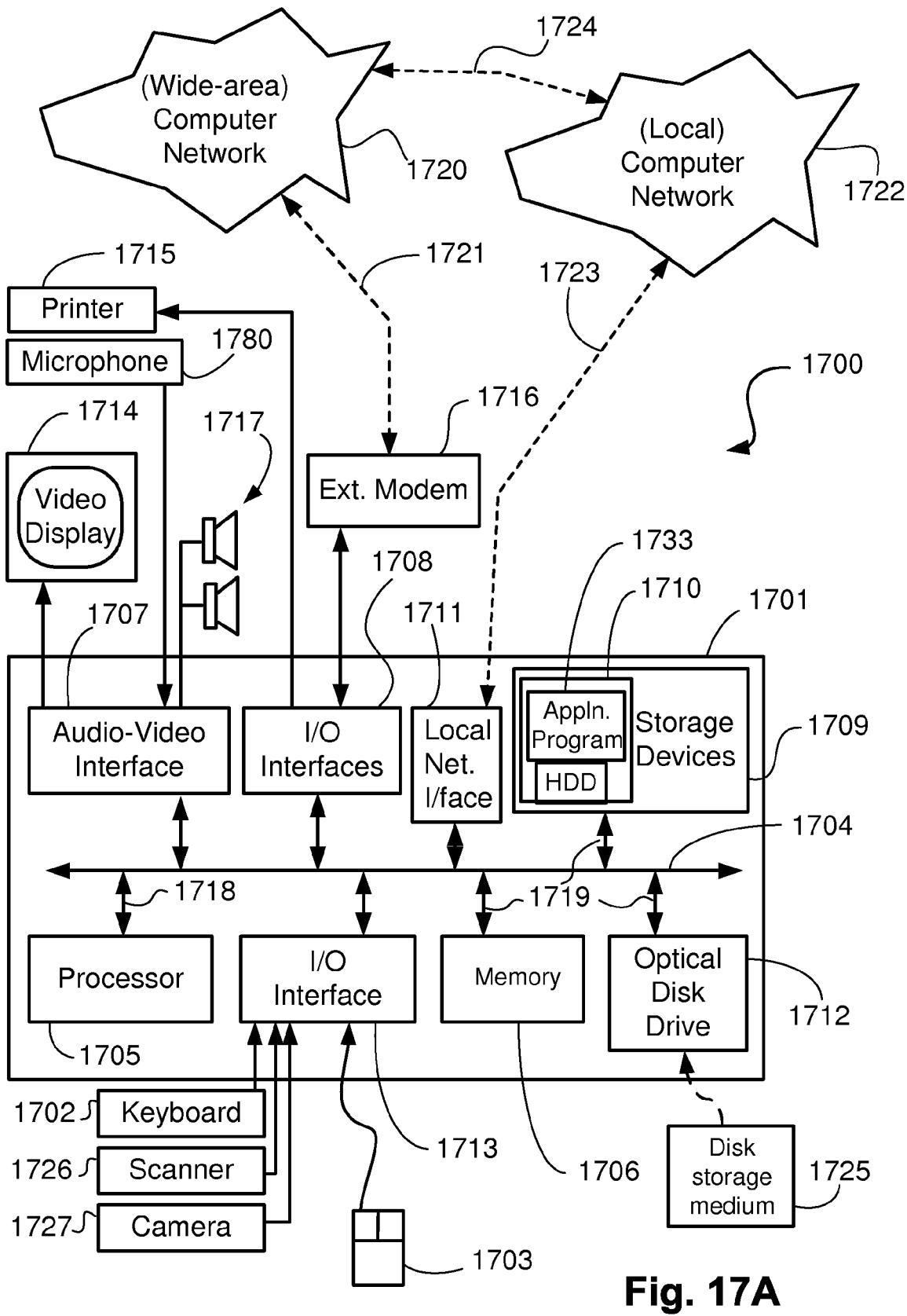
FIGS. 17A and 17B form a schematic block diagram of a general purpose computer system upon which arrangements described can be practised.
Figure 17B:
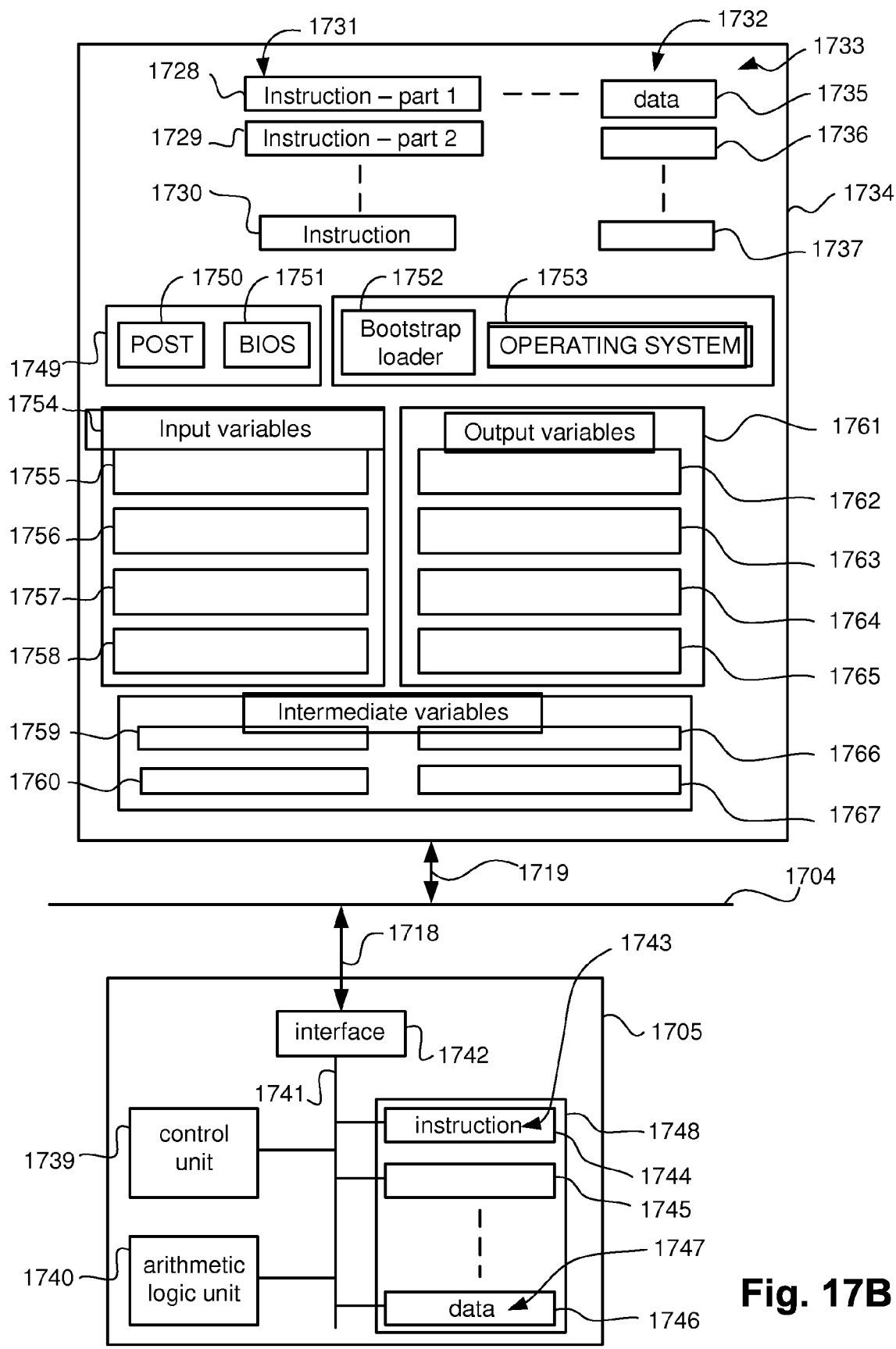

FIGS. 17A and 17B collectively form a schematic block diagram of a general purpose computer system 1700, upon which the various arrangements described can be practised.

As seen in FIG. 17A, the computer system 1700 is formed by a computer module 1701, input devices such as a keyboard 1702, a mouse pointer device 1703, a scanner 1726, a camera 1727, and a microphone 1780, and output devices including a printer 1715, a display device 1714 and loudspeakers 1717. An external Modulator-Demodulator (Modem) transceiver device 1716 may be used by the computer module 1701 for communicating to and from a communications network 1720 via a connection 1721. The network 1720 may be a wide-area network (WAN), such as the Internet, or a private WAN. Where the connection 1721 is a telephone line, the modem 1716 may be a traditional "dial-up" modem. Alternatively, where the connection 1721 is a high capacity (eg: cable) connection, the modem 1716 may be a broadband modem. A wireless modem may also be used for wireless connection to the network 1720.

The computer module 1701 typically includes at least one processor unit 1705, and a memory unit 1706 for example formed from semiconductor random access memory (RAM) and semiconductor read only memory (ROM). The module 1701 also includes an number of input/output (I/O) interfaces including an audio-video interface 1707 that couples to the video display 1714, loudspeakers 1717 and microphone 1780, an I/O interface 1713 for the keyboard 1702, mouse 1703, scanner 1726, camera 1727 and optionally a joystick (not illustrated), and an interface 1708 for the external modem 1716 and printer 1715. In some implementations, the modem 1716 may be incorporated within the computer module 1701, for example within the interface 1708. The computer module 1701 also has a local network interface 1711 which, via a connection 1723, permits coupling of the computer system 1700 to a local computer network 1722, known as a Local Area Network (LAN). As also illustrated, the local network 1722 may also couple to the network 1720 via a connection 1724, which would typically include a so-called "firewall" device or device of similar functionality. The interface 1711 may be formed by an Ethernet™ circuit card, a Bluetooth™ wireless arrangement or an IEEE 802.11 wireless arrangement.

The interfaces 1708 and 1713 may afford either or both of serial and parallel connectivity, the former typically being implemented according to the Universal Serial Bus (USB) standards and having corresponding USB connectors (not illustrated). Storage devices 1709 are provided and typically include a hard disk drive (HDD) 1710. Other storage devices such as a floppy disk drive and a magnetic tape drive (not illustrated) may also be used. An optical disk drive 1712 is typically provided to act as a non-volatile source of data. Portable memory devices, such optical disks (e.g., CD-ROM, DVD), USB-RAM, and floppy disks, for example, may then be used as appropriate sources of data to the system 1700.

The components 1705 to 1713 of the computer module 1701 typically communicate via an interconnected bus 1704 and in a manner which results in a conventional mode of operation of the computer system 1700 known to those in the relevant art. Examples of computers on which the described arrangements can be practised include IBM-PCs and compatibles, Sun Sparcstations, Apple Mac™, or alike computer systems evolved therefrom.

The method of appearance-invariant tracking of an object in an image sequence may be implemented using the computer system 1700 wherein the processes of FIGS. 1 to 15, described herein, may be implemented as one or more software application programs 1733 executable within the computer system 1700. In particular, the steps of the method of appearance-invariant tracking of an object in an image sequence are effected by instructions 1731 in the software 1733 that are carried out within the computer system 1700. The software instructions 1731 may be formed as one or more code modules, each for performing one or more particular tasks. The software may also be divided into two separate parts, in which a first part and the corresponding code modules perform the appearance-invariant tracking methods and a second part and the corresponding code modules manage a user interface between the first part and the user.

The software 1733 is generally loaded into the computer system 1700 from a computer readable medium, and is then typically stored in the HDD 1710, as illustrated in FIG. 17A, or the memory 1706, after which the software 1733 can be executed by the computer system 1700. In some instances, the application programs 1733 may be supplied to the user encoded on one or more CD-ROMs 1725 and read via the corresponding drive 1712 prior to storage in the memory 1710 or 1706. Alternatively, the software 1733 may be read by the computer system 1700 from the networks 1720 or 1722 or loaded into the computer system 1700 from other computer readable media. Computer readable storage media refers to any storage medium that participates in providing instructions and/or data to the computer system 1700 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 1701. Examples of computer readable transmission media that may also participate in the provision of software, application programs, instructions and/or data to the computer module 1701 include radio or infra-red transmission channels, as well as a network connection to another computer or networked device, and the Internet or Intranets including e-mail transmissions and information recorded on Websites and the like.

The second part of the application programs 1733 and the corresponding code modules mentioned above may be executed to implement one or more graphical user interfaces (GUIs) to be rendered or otherwise represented upon the display 1714. Through manipulation of typically the keyboard 1702 and the mouse 1703, a user of the computer system 1700 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1717 and user voice commands input via the microphone 1780.

FIG. 17B is a detailed schematic block diagram of the processor 1705 and a "memory" 1734. The memory 1734 represents a logical aggregation of all the memory devices (including the HDD 1710 and semiconductor memory 1706) that can be accessed by the computer module 1701 in FIG. 17A.

When the computer module 1701 is initially powered up, a power-on self-test (POST) program 1750 executes. The POST program 1750 is typically stored in a ROM 1749 of the semiconductor memory 1706. A program permanently stored in a hardware device such as the ROM 1749 is sometimes referred to as firmware. The POST program 1750 examines hardware within the computer module 1701 to ensure proper functioning, and typically checks the processor 1705, the memory (1709, 1706), and a basic input-output systems software (BIOS) module 1751, also typically stored in the ROM 1749, for correct operation. Once the POST program 1750 has run successfully, the BIOS 1751 activates the hard disk drive 1710. Activation of the hard disk drive 1710 causes a bootstrap loader program 1752 that is resident on the hard disk drive 1710 to execute via the processor 1705. This loads an operating system 1753 into the RAM memory 1706 upon which the operating system 1753 commences operation. The operating system 1753 is a system level application, executable by the processor 1705, to fulfil various high level functions, including processor management, memory management, device management, storage management, software application interface, and generic user interface.

The operating system 1753 manages the memory (1709, 1706) in order to ensure that each process or application running on the computer module 1701 has sufficient memory in which to execute without colliding with memory allocated to another process. Furthermore, the different types of memory available in the system 1700 must be used properly so that each process can run effectively. Accordingly, the aggregated memory 1734 is not intended to illustrate how particular segments of memory are allocated (unless otherwise stated), but rather to provide a general view of the memory accessible by the computer system 1700 and how such is used.

The processor 1705 includes a number of functional modules including a control unit 1739, an arithmetic logic unit (ALU) 1740, and a local or internal memory 1748, sometimes called a cache memory. The cache memory 1748 typically includes a number of storage registers 1744-1746 in a register section. One or more internal buses 1741 functionally interconnect these functional modules. The processor 1705 typically also has one or more interfaces 1742 for communicating with external devices via the system bus 1704, using a connection 1718.

The application program 1733 includes a sequence of instructions 1731 that may include conditional branch and loop instructions. The program 1733 may also include data 1732 which is used in execution of the program 1733. The instructions 1731 and the data 1732 are stored in memory locations 1728-1730 and 1735-1737 respectively. Depending upon the relative size of the instructions 1731 and the memory locations 1728-1730, a particular instruction may be stored in a single memory location as depicted by the instruction shown in the memory location 1730. Alternately, an instruction may be segmented into a number of parts each of which is stored in a separate memory location, as depicted by the instruction segments shown in the memory locations 1728-1729.

In general, the processor 1705 is given a set of instructions which are executed therein. The processor 1705 then waits for a subsequent input, to which it reacts to by executing another set of instructions. Each input may be provided from one or more of a number of sources, including data generated by one or more of the input devices 1702, 1703, data received from an external source across one of the networks 1720, 1722, data retrieved from one of the storage devices 1706, 1709 or data retrieved from a storage medium 1725 inserted into the corresponding reader 1712. The execution of a set of the instructions may in some cases result in output of data. Execution may also involve storing data or variables to the memory 1734.

The appearance-invariant tracking arrangements disclosed herein use input variables 1754, that are stored in the memory 1734 in corresponding memory locations 1755-1758. The appearance-invariant tracking arrangements produce output variables 1761, that are stored in the memory 1734 in corresponding memory locations 1762-1765. Intermediate variables may be stored in memory locations 1759, 1760, 1766 and 1767.

The register section 1744-1746, the arithmetic logic unit (ALU) 1740, and the control unit 1739 of the processor 1705 work together to perform sequences of micro-operations needed to perform "fetch, decode, and execute" cycles for every instruction in the instruction set making up the program 1733. Each fetch, decode, and execute cycle comprises:

(a) a fetch operation, which fetches or reads an instruction 1731 from a memory location 1728;

(b) a decode operation in which the control unit 1739 determines which instruction has been fetched; and (c) an execute operation in which the control unit 1739 and/or the ALU 1740 execute the instruction.

Thereafter, a further fetch, decode, and execute cycle for the next instruction may be executed. Similarly, a store cycle may be performed by which the control unit 1739 stores or writes a value to a memory location 1732.

Each step or sub-process in the processes of FIGS. 1 to 15 is associated with one or more segments of the program 1733, and is performed by the register section 1744-1747, the ALU 1740, and the control unit 1739 in the processor 1705 working together to perform the fetch, decode, and execute cycles for every instruction in the instruction set for the noted segments of the program 1733.

The method of appearance-invariant tracking of an object in an image sequence may alternatively be implemented in dedicated hardware such as one or more integrated circuits performing the functions or sub functions of detecting an object in a frame of the image sequence, determining a spatial difference, and computing a visual difference. Such dedicated hardware may include graphic processors, digital signal processors, or one or more microprocessors and associated memories, or a camera incorporating one or more of these components.

Industrial Applicability

It is apparent from the above that the arrangements described are applicable to the image processing and data processing industries.

The foregoing describes only some embodiments of the present invention, and modifications and/or changes can be made thereto without departing from the scope and spirit of the invention, the embodiments being illustrative and not restrictive.

I claim:

1. A method for tracking an object in an image sequence, wherein a track in the image sequence is associated with a track signature, the track signature comprising at least one mode, said method comprising the steps of:

detecting the object in a current frame of the image sequence;

associating the detected object with a representative signature;

determining a spatial difference indicating a difference in size or position between the track and the detected object;

determining a visual difference between the at least one mode of the track signature and the representative signature;

combining the spatial difference and the visual difference into a combined difference; and associating the detected object with the track if the combined difference is less than a combined difference threshold.

2. The method according to claim 1, further comprising the step of adding a new mode to the track signature based on the representative signature, if the combined difference is not less than the combined difference threshold and the spatial difference is less than a spatial difference threshold.

3. The method according to claim 2, further comprising the step of deleting an existing mode of the track signature before said step of adding the new mode to the track signature.

4. The method according to claim 3, wherein in said step of deleting, the existing mode of the track signature is deleted based on frame information selected from the group consisting of:

a frame number of the frame in which the existing mode was added to the track signature;

a number of frames in which the existing mode was used in obtaining a lowest difference;

a frame number of the frame in which the existing mode was most recently used in obtaining the lowest difference; and a frame number of the current frame.

5. The method according to claim 1, wherein in said step of combining, the combined difference is obtained by summing the spatial difference and the determined visual difference.

6. The method according to claim 1, wherein the track signature and the representative signature are derived from at least one histogram.

7. The method according to claim 1, wherein in said step of determining the visual difference comprises the steps of, obtaining a visual difference between each of a plurality of modes of the track signature and the representative signature; and selecting a lowest visual difference from among the visual differences for the plurality of modes as the determined visual difference.

8. The method according to claim 7, further comprising the step of selecting a best mode of the track signature, the best mode being associated with the lowest visual difference.

9. The method according to claim 8, further comprising the step of updating the best mode resulting in the lowest visual difference of the track signature if the combined difference is less than the combined difference threshold.

10. An apparatus for tracking an object in an image sequence, wherein a track in the image sequence is associated with a track signature which comprises at least one mode, said apparatus comprising:

a detection unit configured to detect the object in a current frame of the image sequence;

a first association unit configured to associate the detected object with a representative signature;

a first determination unit configured to determine a spatial difference indicating a difference in size or position between the track and the detected object;

a second determination unit configured to determine a visual difference between the at least one mode of the track signature and the representative signature;

a combining unit configured to combine the spatial difference and the visual difference into a combined difference; and a second association unit configured to associate the detected object with the track if the combined difference is less than a combined difference threshold.

11. A non-transitory computer readable storage medium having recorded thereon a computer program for tracking an object in an image sequence, wherein a track in the image sequence is associated with a track signature which comprises at least one mode, said computer program comprising program codes for performing the steps of:

detecting the object in a current frame of the image sequence;

associating the detected object with a representative signature;

determining a spatial difference indicating a difference in size or position between the track and the detected object;

determining a visual difference between the at least one mode of the track signature and the representative signature;

combining the spatial difference and the visual difference into a combined difference; and associating the detected object with the track if the combined difference is less than a combined difference threshold.

* * * * *